(12) United States Patent
Ohashi et al.

(10) Patent No.: US 6,439,073 B2
(45) Date of Patent: Aug. 27, 2002

(54) SHIFT CONTROL SYSTEM FOR VEHICULAR AUTOMATIC TRANSMISSION

(75) Inventors: Tatsuyuki Ohashi; Takamichi Shimada; Noboru Sekine; Yutaka Yamamoto; Hideki Wakamatsu, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/785,526

(22) Filed: Feb. 20, 2001

(30) Foreign Application Priority Data

Feb. 21, 2000 (JP) ........................................ 2000-042291

(51) Int. Cl.[7] .............................................. F16H 59/00
(52) U.S. Cl. ...................................... 74/336 R; 74/335
(58) Field of Search .............................. 74/335, 336 R

(56) References Cited

U.S. PATENT DOCUMENTS 6,199,003 B1 * 3/2001 Hollingsworth et al. ...... 701/52

FOREIGN PATENT DOCUMENTS

JP 2-8545 1/1990
JP 6-221417 8/1994

* cited by examiner

*Primary Examiner*—Dirk Wright
(74) *Attorney, Agent, or Firm*—Arent Fox Kintner Plotkin & Kahn, PLLC

(57) ABSTRACT

A shift control system for an automatic transmission comprises a shift lever 201, which is shifted among a "P" position, an "N" position and an "S" position. A first shift guide path 211 is provided to guide the shift lever from the "P" position through the "N" position to the "S" position, and a second shift guide path 212 is provided to guide the shift lever which has been positioned at the "S" position in a direction different from that of the first shift guide path. Along this second shift guide path, the shift lever is shifted to select and set a plurality of ranges necessary for driving a vehicle, including a forward drive range, a neutral range and a reverse drive range.

12 Claims, 23 Drawing Sheets

Fig. 15

| Lever position | | Function |
|---|---|---|
| P position | | Parking |
| N position | | Newtral |
| S position | | R – N – D Selectable |
| Shift switch | + operation | Each operation causes a shift in the direction of "1→R" |
| | – operation | Each operation causes a shift in the direction of "R→1" |
| | + operation | Each operation causes a shift in the direction of "1→D5" |
| | – operation | Each operation causes a shift in the direction of "D5→1" |

Fig. 16

| Functions at "S" position | | | | Shift switch | |
|---|---|---|---|---|---|
| + operation | – operation | Range | Shift control | | |
| ↑ | ↓ | R | Reverse | | |
| | | N | Neutral | + operation | – operation |
| | | D5 | 1-2-3-4-5 automatic | ↑ | ↓ |
| | | D4 | 1-2-3-4 automatic | | |
| | | D3 | 1-2-3 automatic | | |
| | | 2 | SECOND fixed | | |
| | | 1 | FIRST fixed | | |

…

SHIFT CONTROL SYSTEM FOR VEHICULAR AUTOMATIC TRANSMISSION

FIELD OF THE INVENTION

The present invention relates to a shift control system used for a vehicular automatic transmission comprising a shift lever, which is manipulated by a driver.

BACKGROUND OF THE INVENTION

A vehicular automatic transmission is designed to perform automatic speed control for a vehicle on the basis of the following conditions: the position of the shift lever, which is manipulated by the driver at the driver's seat of the vehicle; the movement of the accelerator pedal being stepped down by the driver in relation with the respective drive range determined by the position of the shift lever; the speed of the vehicle, etc. The drive ranges which can be selected by the manipulation of the shift lever are, for example, a parking range (P range), a reverse drive range (R range), a neutral range (N range), and a forward drive range (e.g., D range, etc.), and in many cases, the forward drive range comprises, for example, D range, S range, "2" range and "1" range. For the selection of these ranges, generally, the shift lever is swiveled in a plane appropriately to select respective drive ranges. In this case, a shift guide path is provided linearly in a form of slot at the driver's seat, and the shift lever, which extends through the shift guide path, is manipulated along the guide path by the driver for the selection of the drive ranges.

On the basis of this design, shift control systems have been proposed and designed in variation not only to enable the shift lever to swivel linearly along a linear shift guide path but also to allow various patterns of shift manipulation through appropriate arrangement of shift guide paths. For example, Japanese Laid-Open Patent Publication No. H2(1990)-8545 discloses a shift control system with two shift guide paths: a first shift guide path (or first shift path), which is linear as the above described shift guide path, and a second shift guide path provided parallel with this first shift guide path. The manipulation of the shift lever along the first shift guide path enables the selection of the following drive ranges: P, R, N, D, 3, 2 and 1. In this system, when the shift lever is at the position for the D range, it can be moved into the second shift guide path. Then, in the second shift guide path, the shift lever is manipulated for exclusive selection of the D, 3, 2 and 1 ranges.

Also, Japanese Laid-Open Patent Publication No. H6(1994)-221417 discloses a shift control system which allows the shift lever to be manipulated not only linearly in a shift guide path for selection of P, R, N, D and B ranges but also perpendicularly to this shift guide path when the shift lever is at the B range position, for an upshift and a downshift in steps. Furthermore, this patent publication discloses a shift control system in which the shift lever is manipulated along a linear first shift guide path to select P, R, N, D, M and L ranges and is movable laterally at the M range into a second shift guide path, where the shift lever is manipulated for an upshift and a downshift in steps.

Although various types of shift control systems have been proposed as mentioned above, it is generally considered advantageous to differentiate the P range from the other drive ranges. The P range is a range to be set when the engine is not operating. It is usually selected when the vehicle is parked, i.e., when the engine is stopped and the driver leaves the vehicle behind. On the other hand, the other ranges are set while the driver is operating the vehicle at the driver's seat. There is a significant difference between the condition where the P range is set and the condition where the other ranges are set. Therefore, a shift control system, if it is designed to offer a clear difference in the manipulation of the shift lever for the selection of the P range, is considered to improve the operativity of the shift lever.

SUMMARY OF THE INVENTION

It is an object of the present invention to provide a shift control system for a vehicular automatic transmission, which system offers a clear difference in the manipulation of the shift lever so that the driver can differentiate clearly a range for parking (P range) from other drive ranges (for example, R and D ranges).

In order to achieve this objective, the present invention provides a shift control system for a vehicular automatic transmission comprising a shift lever, which is manipulated and translated at least among a parking position, a neutral position, and a selective position. The shift control system is provided with a first shift guide path to guide the shift lever from the parking position ("P" position) through the neutral position ("N" position) to the selection position ("S" position) and a second shift guide path to guide the shift lever which has been positioned at the selection position into a direction different from that of the first shift guide path. In this second shift guide path, the shift lever is shifted appropriately to select and establish a plurality of ranges necessary for driving a vehicle, including a forward drive range, a neutral range and a reverse drive range.

In this shift control system, the shift lever is shifted along the first shift guide path to select the position used for parking ("P" position) or the position used for driving ("S" position). When the vehicle is driven, the shift lever is shifted along the second shift guide path to select and establish a plurality of drive ranges (D5, D4, D3, 2, 1, etc.). In other words, the range selection for parking the vehicle is executed by the manipulation of the shift lever along the first shift guide path while the range selection for driving the vehicle is executed by the manipulation of the shift lever along the second shift guide path. Therefore, the shift control system according to the present invention provides a good operativity for shift lever manipulation.

This shift control system can be arranged such that when the shift lever is shifted from the neutral position to the selection position in the first shift guide path, the neutral range is established, and then every time when the shift lever is swiveled in the second shift guide path, an appropriate range is selected in a predetermined sequence. With this arrangement, the control of the vehicle flows smoothly from the parking condition to the driving condition because the neutral range is the first range which is selected when the shift lever is shifted from the neutral position to the selection position in the first shift guide path. Furthermore, as the selection of the drive ranges is effected simply by swiveling the shift lever at the selection position along the second shift guide path, the shift control system according to the present invention makes the manipulation of the shift lever during the drive easy and simple.

It is preferable that the shift control system be provided with a vehicle speed sensor which detects the speed of the vehicle and that the system be arranged to prohibit the selection of a first predetermined range (for example, the reverse drive range) even though the shift lever is manipulated along the second shift guide path while the speed of the vehicle detected by the vehicle speed sensor is equal to or higher than a predetermined speed. With this arrangement, even if the driver manipulates the shift lever accidentally in a way to select the reverse range while the vehicle is driving forward, for example, the neutral range can be established for safety instead of the reverse range.

Furthermore, it is also preferable that the shift control system be provided with abnormality detection means for detecting abnormality or a failure in the execution of the range selection performed in response to the manipulation of the shift lever. In this case, the system is preferably arranged such that if a failure is detected by the abnormality detection means, then a second predetermined range can be selected and established automatically when the shift lever is positioned at the selection position. With this arrangement, if a failure or abnormality is detected, the transmission is set, for example, into the "2" range as the second predetermined range, and the vehicle in this limited performance can be driven to a garage for repair.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention and wherein:

FIG. 15 is a table describing a speed change function for each position of the shift lever.

FIG. 16 is a table describing drive ranges which are set for the manipulation of the shift lever at "S" position, and the functions of these drive ranges.

DESCRIPTION OF THE PREFERRED EMBODIMENTS

Figure 1:
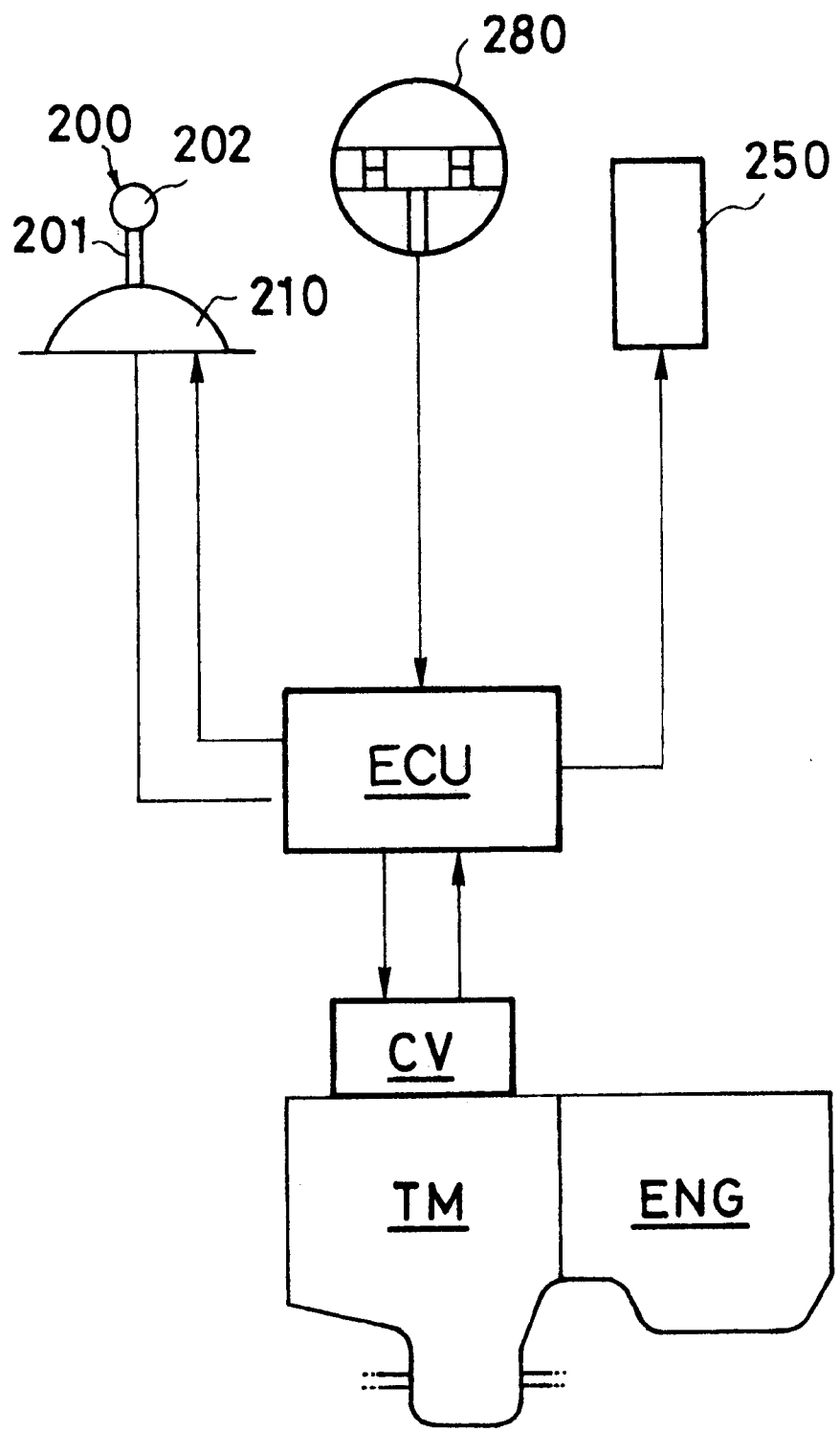
FIG. 1 is a schematic block diagram showing the whole construction of a shift control system according to the present invention and an automatic transmission, which is controlled by the shift control system.

In reference to the drawings, a shift control system according to the present invention and a vehicular automatic transmission, whose drive ranges are selected and established by the shift control system, will be described in the following. FIG. 1 shows the whole construction of the power transmission mechanism, including the shift control system. This power transmission mechanism comprises an engine ENG, an automatic transmission TM, which transmits the output of the engine to wheels with a speed change. This speed change through the automatic transmission TM is controlled hydraulically by a shift control valve CV, whose operation is determined by solenoid valves, which are, in turn, controlled with shift control signals by an electronic control unit ECU. The electronic control unit ECU is connected with a shift manipulation unit 200, a shift manipulation switching unit 280, which is provided on the steering wheel, and a shift indicator unit 250, which is provided in an instrument panel.

At first, the construction of the automatic transmission TM is described in reference to FIGS. 2~5. In a transmission housing HSG, this transmission comprises a torque converter TC, which is connected to the output shaft of an engine (not shown), a parallel shaft speed change mechanism TM, which is connected to the output member (or turbine) of the torque converter TC, and a differential mechanism DF including a last reduction driven gear 6b, which meshes with a last reduction drive gear 6a provided in the speed change mechanism TM. The drive power for the vehicle is transmitted through the differential mechanism DF to lateral wheels.

Figure 4A:
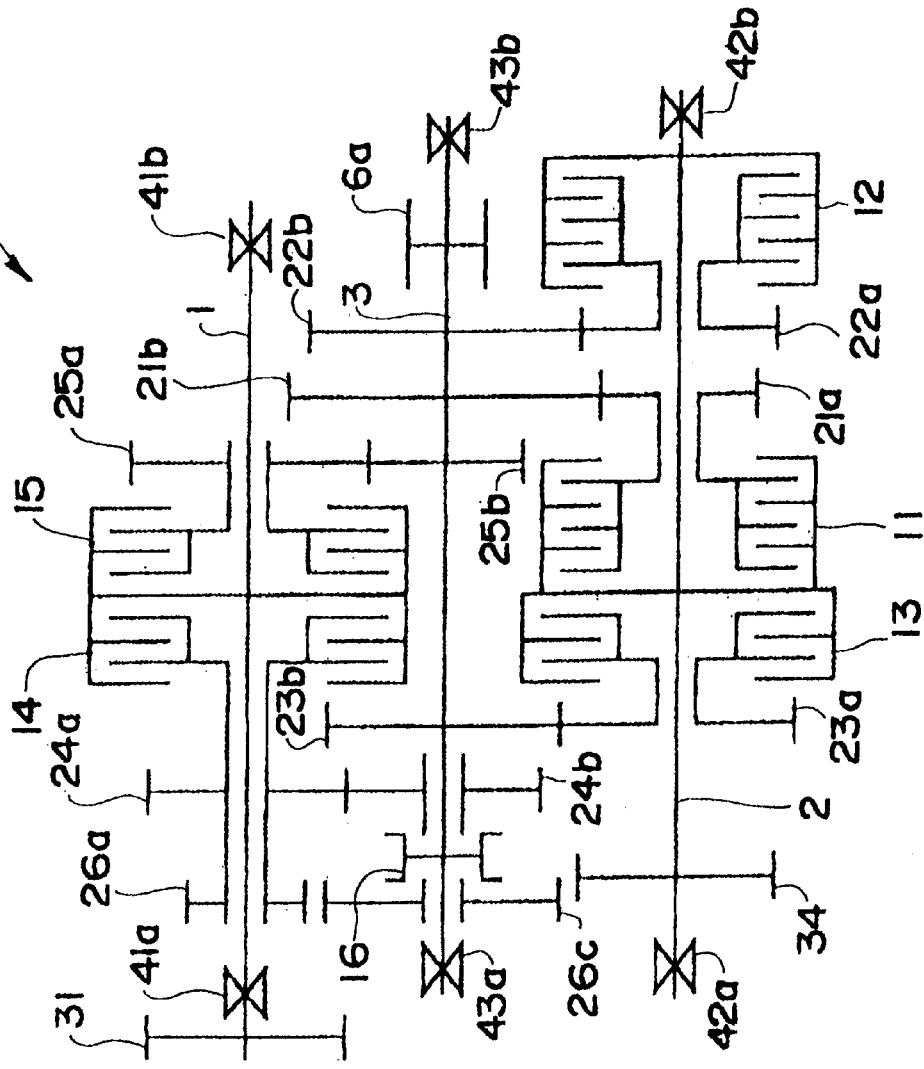
FIG. 4 is a skeleton diagram which shows schematically the power transmission system of the automatic transmission.
Figure 4B:
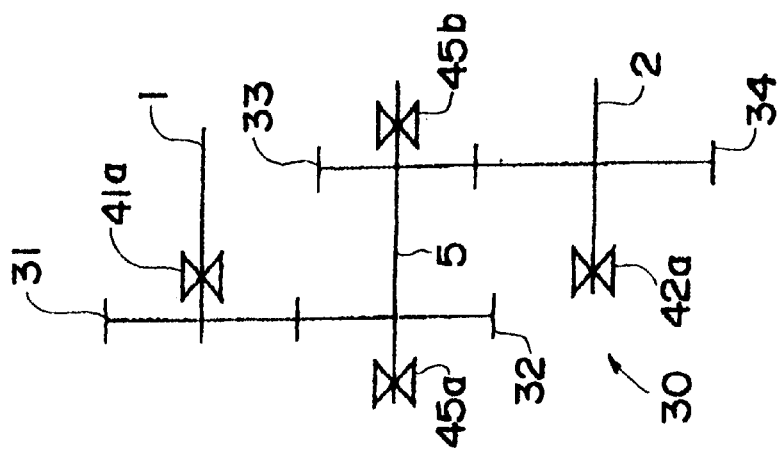
Figure 5:
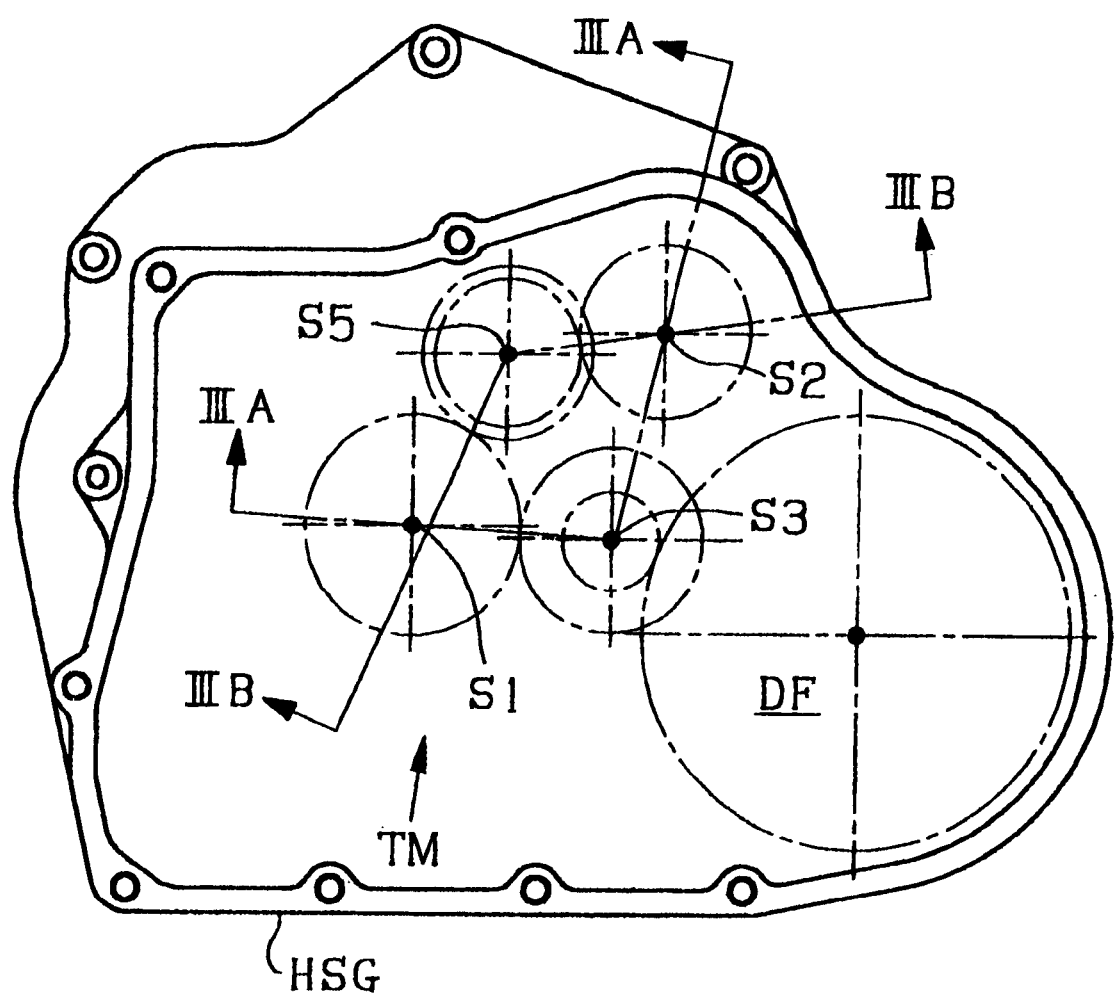
FIG. 5 is a schematic diagram showing the relative positions of the shafts of the automatic transmission.

The parallel shaft speed change mechanism TM includes a first input shaft 1, a second input shaft 2, a countershaft 3, and an idle shaft 5, all of which are disposed parallel with one another. FIG. 5 shows the positions of these shafts in the housing, the centers of the shafts being indicated by corresponding alphanumeric marks, S1, S2, S3 and S5. FIGS. 4A and 4B show the rotational components of the speed change mechanism TM, which are arranged for mechanical power transmission. FIG. 4A is a schematic sectional view showing the first input shaft 1 (S1), the second input shaft 2 (S2) and the countershaft 3 (S3), which are taken along line IIIA—IIIA in FIG. 5, while FIG. 4B is a schematic sectional view showing the first input shaft 1 (S1), the second input shaft 2 (S2) and the idle shaft 5 (S5), which are taken along line IIIB—IIIB in FIG. 5. Furthermore, FIG. 2 corresponds with FIG. 4A while FIG. 3 corresponds with FIG. 4B, all of which are sectional views of the speed change mechanism TM.

The first input shaft 1 is connected directly to the turbine of the torque converter TC and is supported rotatably by bearings 41a and 41b. The first input shaft 1 receives the drive power from the turbine and rotates with it at the same rotational speed. On this input shaft 1, from the side of the torque converter TC (i.e., the right side of the drawing), disposed are a FIFTH speed drive gear 25a, a FIFTH speed clutch 15, a FOURTH speed clutch 14, a FOURTH speed drive gear 24a, a reverse drive gear 26a, and a first connection gear 31. The FIFTH speed drive gear 25a is disposed rotatably on the first input shaft 1, and the FIFTH speed clutch 15, which is actuated hydraulically, engages with the FIFTH speed drive gear 25a to connect it rotationally to the first input shaft 1. The FOURTH speed drive gear 24a and the reverse drive gear 26a, which are coupled as one body, are disposed rotatably on the first input shaft 1, and the FOURTH speed clutch 14, which is actuated hydraulically, engages with these gears to connect them rotationally to the first input shaft 1. The first connection gear 31 is mounted on the first input shaft 1, at the left end thereof outside the bearing 41a, which supports the first input shaft 1 rotatably. In this condition, the first connection gear 31 and this end portion of the first input shaft 1 are supported only by this bearing 41a in cantilever.

The second input shaft 2 is also supported rotatably by bearings 42a and 42b. On this input shaft 2, from the right side of the drawing, disposed are a SECOND speed clutch 12, a SECOND speed drive gear 22a, a LOW drive gear 21a, a LOW clutch 11, a THIRD speed clutch 13, a THIRD speed drive gear 23a, and a fourth connection gear 34. The SECOND speed drive gear 22a, the LOW drive gear 21a and the THIRD speed drive gear 23a are each disposed rotatably on the second input shaft 2, and the SECOND speed clutch 12, the LOW clutch 11, or the THIRD speed clutch 13, which is actuated hydraulically, engages with the respective gear to connect it rotationally to the second input shaft 2. In addition, the fourth connection gear 34 is coupled to the second input shaft 2.

The idle shaft 5 including a second connection gear 32 and a third connection gear 33, which are formed as one body with the idle shaft 5, is supported rotatably by bearings 45a and 45b. The second connection gear 32 meshes with the first connection gear 31 while the third connection gear 33 meshes with the fourth connection gear 34. The first, second, third and fourth connection gears constitute a connection gear train 30, through which the rotation of the first input shaft 1 is transmitted continually to the second input shaft 2.

The countershaft 3 is supported rotatably by bearings 43a and 43b. On this shaft 3, from the right side of the drawing, disposed are the above mentioned last reduction drive gear 6a, a SECOND speed driven gear 22b, a LOW driven gear 21b, a FIFTH speed driven gear 25b, a THIRD speed driven gear 23b, a FOURTH speed driven gear 24b, a dog clutch 16, and a reverse driven gear 26c. The last reduction drive gear 6a, the SECOND speed driven gear 22b, the LOW driven gear 21b, the FIFTH speed driven gear 25b and the THIRD speed driven gear 23b are fixed on and rotate together with the countershaft 3 while the FOURTH speed driven gear 24b and the reverse driven gear 26c are each disposed rotatably on the countershaft 3. The dog clutch 16 is actuated axially in one direction to engage with the FOURTH speed driven gear 24b so as to connect it rotationally to the countershaft 3 or in the opposite direction to engage with the reverse driven gear 26c so as to connect it rotationally to the countershaft 3.

As shown in the drawings, the LOW drive gear 21a meshes with the LOW driven gear 21b; the SECOND speed drive gear 22a meshes with the SECOND speed driven gear 22b; the THIRD speed drive gear 23a meshes with the THIRD speed driven gear 23b; the FOURTH speed drive gear 24a meshes with the FOURTH speed driven gear 24b; and the FIFTH speed drive gear 25a meshes with the FIFTH speed driven gear 25b. In addition, the reverse drive gear 26a meshes with a reverse idler gear 26b (refer to FIG. 3), which then meshes with the reverse driven gear 26c.

Figure 2:
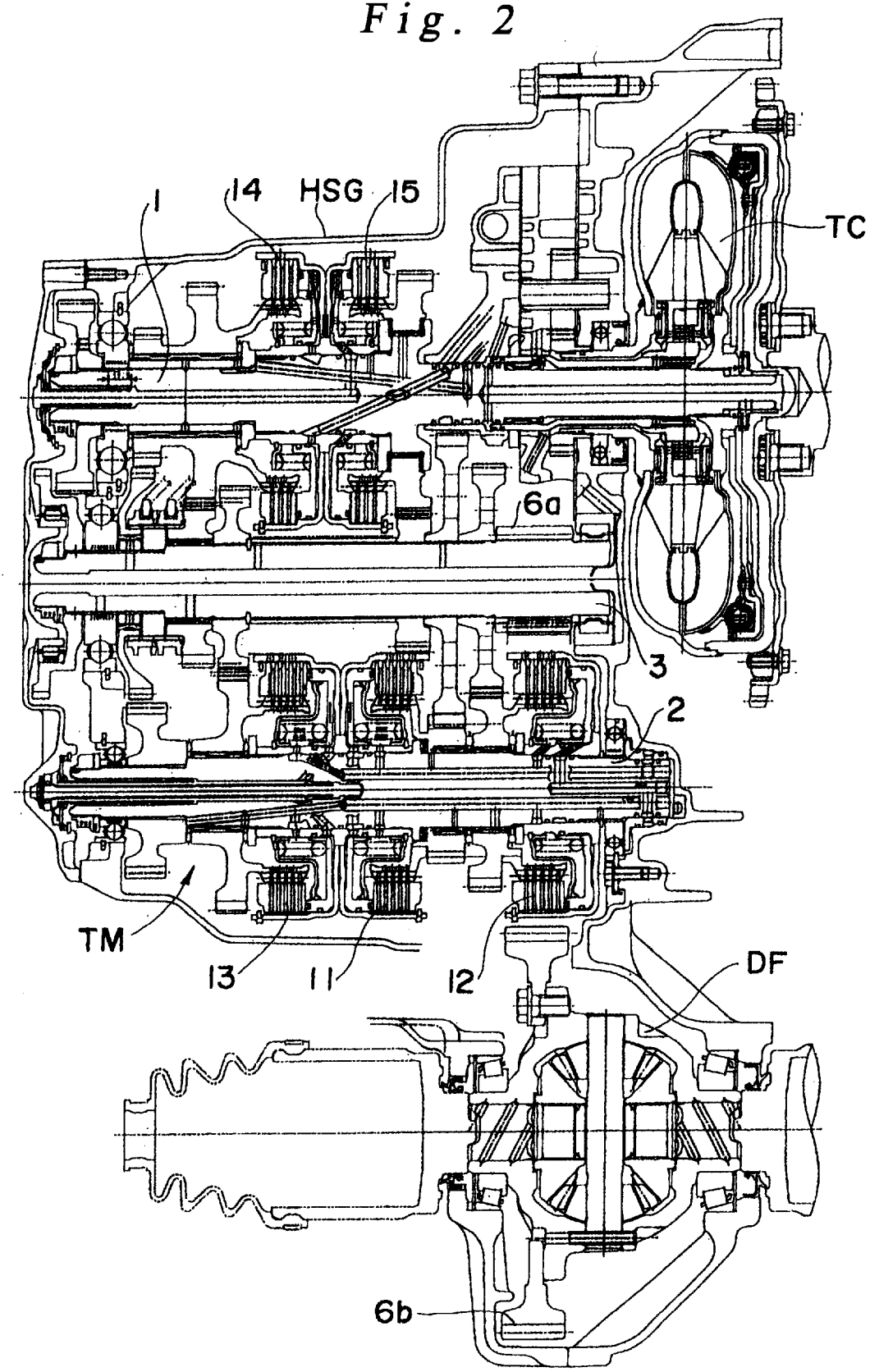
FIG. 2 is a sectional view of the automatic transmission, whose speed change is controlled by the control system according to the present invention.
Figure 3:
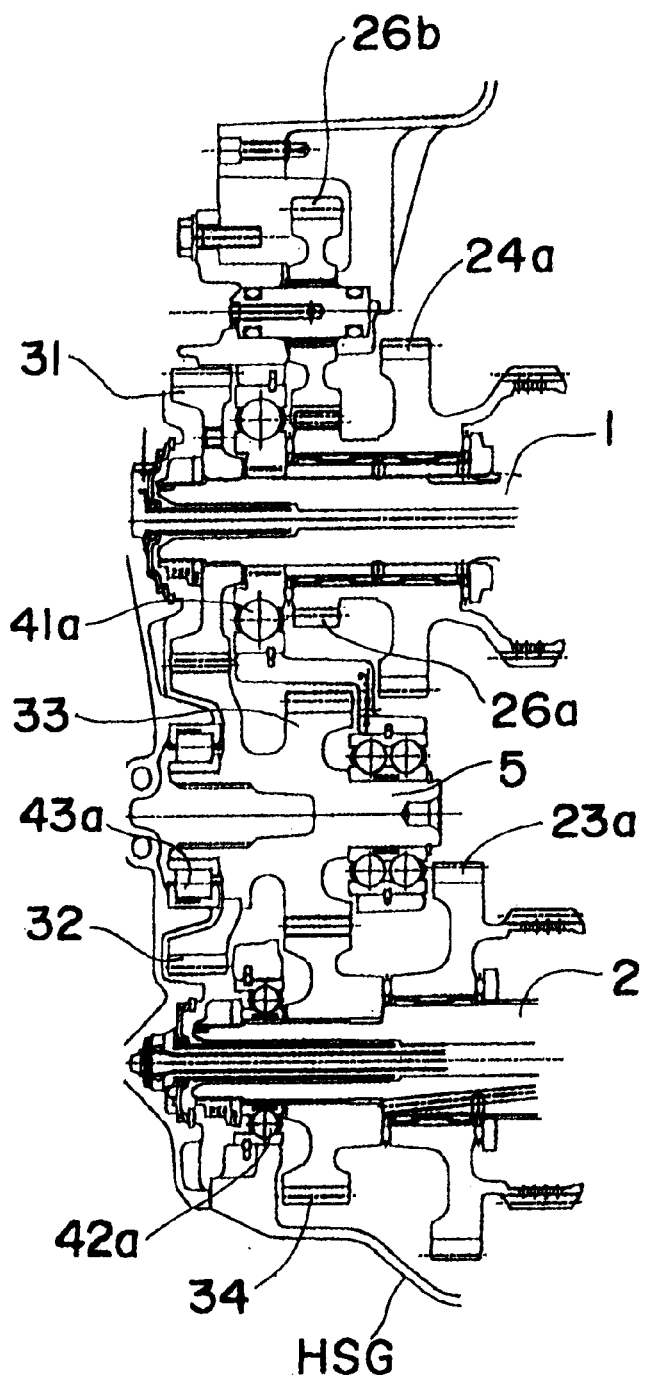
FIG. 3 is a partial sectional view of the automatic transmission.

The last reduction drive gear 6a meshes with the lastreduction driven gear 6b (refer to FIG. 2, which shows that they are situated at the same position in the axial direction though the drawing does not show the actual condition that they mesh with each other). The rotation of the countershaft 3 is transmitted through the last reduction drive and driven gears 6a and 6b to the differential mechanism DF.

Now, a description is given of how each speed ratio is established and through which path the drive power is transmitted at each speed ratio. In this transmission, for establishing the forward drive range, the dog clutch 16 is shifted toward the right side of the drawing, where the dog clutch 16 engages with the FOURTH speed driven gear 24b to connect it rotationally to the countershaft 3. For the reverse drive range, the dog clutch 16 is shifted leftward, where the dog clutch 16 engages with the reverse driven gear 26c to connect it rotationally to the countershaft 3.

First, the establishment of each speed ratio of the forward drive range is described. The LOW ratio is established when the LOW clutch 11 is engaged. The rotational drive power which is input from the torque converter TC to the first input shaft 1 is transmitted through the connection gear train 30 to the second input shaft 2. Because the LOW clutch 11 is engaged, the LOW drive gear 21a which is driven at the same rotational speed as the second input shaft 2 drives the LOW driven gear 21b mounted on the countershaft 3. This drive power is then transmitted through the last reduction drive and driven gears 6a and 6b to the differential mechanism DF.

The SECOND speed ratio is established when the SECOND speed clutch 12 is engaged. The rotational drive power which is input from the torque converter TC to the first input shaft 1 is transmitted through the connection gear train 30 to the second input shaft 2. Because the SECOND speed clutch 12 is engaged, the SECOND speed drive gear 22a which is driven at the same rotational speed as the second input shaft 2 drives the SECOND speed driven gear 22b mounted on the countershaft 3. This drive power is then transmitted through the last reduction drive and driven gears 6a and 6b to the differential mechanism DF.

The THIRD speed ratio is established when the THIRD speed clutch 13 is engaged. The rotational drive power which is input from the torque converter TC to the first input shaft 1 is transmitted through the connection gear train 30 to the second input shaft 2. Because the THIRD speed clutch 13 is engaged, the THIRD speed drive gear 23a which is driven at the same rotational speed as the second input shaft 2 drives the THIRD speed driven gear 23b mounted on the countershaft 3. This drive power is then transmitted through the last reduction drive and driven gears 6a and 6b to the differential mechanism DF.

The FOURTH speed ratio is established when the FOURTH speed clutch 14 is engaged. The rotational drive power which is input from the torque converter TC to the first input shaft 1 is transmitted through the FOURTH speed clutch 14 to the FOURTH speed drive gear 24a, which drives the FOURTH speed driven gear 24b. Because the dog clutch 16 is kept engaged with the FOURTH speed driven gear 24b for the forward drive range, the countershaft 3 is driven. This drive power is then transmitted through the last reduction drive and driven gears 6a and 6b to the differential mechanism DF.

The FIFTH speed ratio is established when the FIFTH speed clutch 15 is engaged. The rotational drive power which is input from the torque converter TC to the first input shaft 1 is transmitted through the FIFTH speed clutch 15 to the FIFTH speed drive gear 25a, which drives the FIFTH speed driven gear 25b. The FIFTH speed driven gear 25b, which is fixed to the countershaft 3, in turn, drives the countershaft 3. This drive power is then transmitted through the last reduction drive and driven gears 6a and 6b to the differential mechanism DF.

The reverse drive range is established when the FOURTH speed clutch 14 is engaged, and the dog clutch 16 is shifted leftward. The rotational drive power which is input from the torque converter TC to the first input shaft 1 is transmitted through the FOURTH speed clutch 14 to the reverse drive gear 26a, which, in turn, drives the reverse driven gear 26c through the reverse idler gear 26b. Because the dog clutch 16 is engaged with the reverse driven gear 26c for the reverse drive range, the countershaft 3 is driven. This drive power is then transmitted through the last reduction drive and driven gears 6a and 6b to the differential mechanism DF. It should be noted that, as described in this paragraph, the FOURTH speed clutch 14 is used as a reverse clutch for the establishment of the reverse drive range in this transmission in addition to the establishment of the above described FOURTH speed ratio.

Now, in reference to FIGS. 6~11, a description is made of a hydraulic circuit constituting the shift control valve CV, which performs a speed change control in this automatic transmission. FIGS. 7~11 show five sections of the hydraulic circuit at an enlarged scale, which sections are partitioned by alternate long and short dash lines A~E, respectively, in FIG. 6. The points of the oil passages shown open in the hydraulic circuit diagram are connected to a drainage system.

This hydraulic circuit includes an oil pump OP being driven by the engine to supply working oil from an oil tank TO to an oil passage 100. This oil passage 100 is connected through a branch passage 100a to a main regulator valve 50, where the pressure of the oil in the oil passages 100 and 100a is adjusted to a predetermined line pressure PL. This line pressure PL is then supplied through another branch passage 100b to first~fifth on/off solenoid valves 81~85 and to a first linear solenoid valve 86.

Surplus oil from the oil used for the generation of the line pressure PL at the main regulator valve 50 is led to an oil passage 101 and then to another oil passage 102. The oil flowing to the passage 101 is regulated by a lock-up shift valve 51, a lock-up control valve 52 and a torque converter check valve 53, and the oil is used for actuating and locking up the torque converter TC. After being used for the control of the torque converter TC, this oil returns through an oil cooler 54 to the oil tank TO. In this description, no explanation is given of the control of the torque converter TC because the control of the torque converter is not related directly to the present invention. The pressure of the oil supplied to the passage 102 is adjusted by a lubrication relief valve 55, and this oil is used for lubricating various parts of the transmission.

Figure 6:
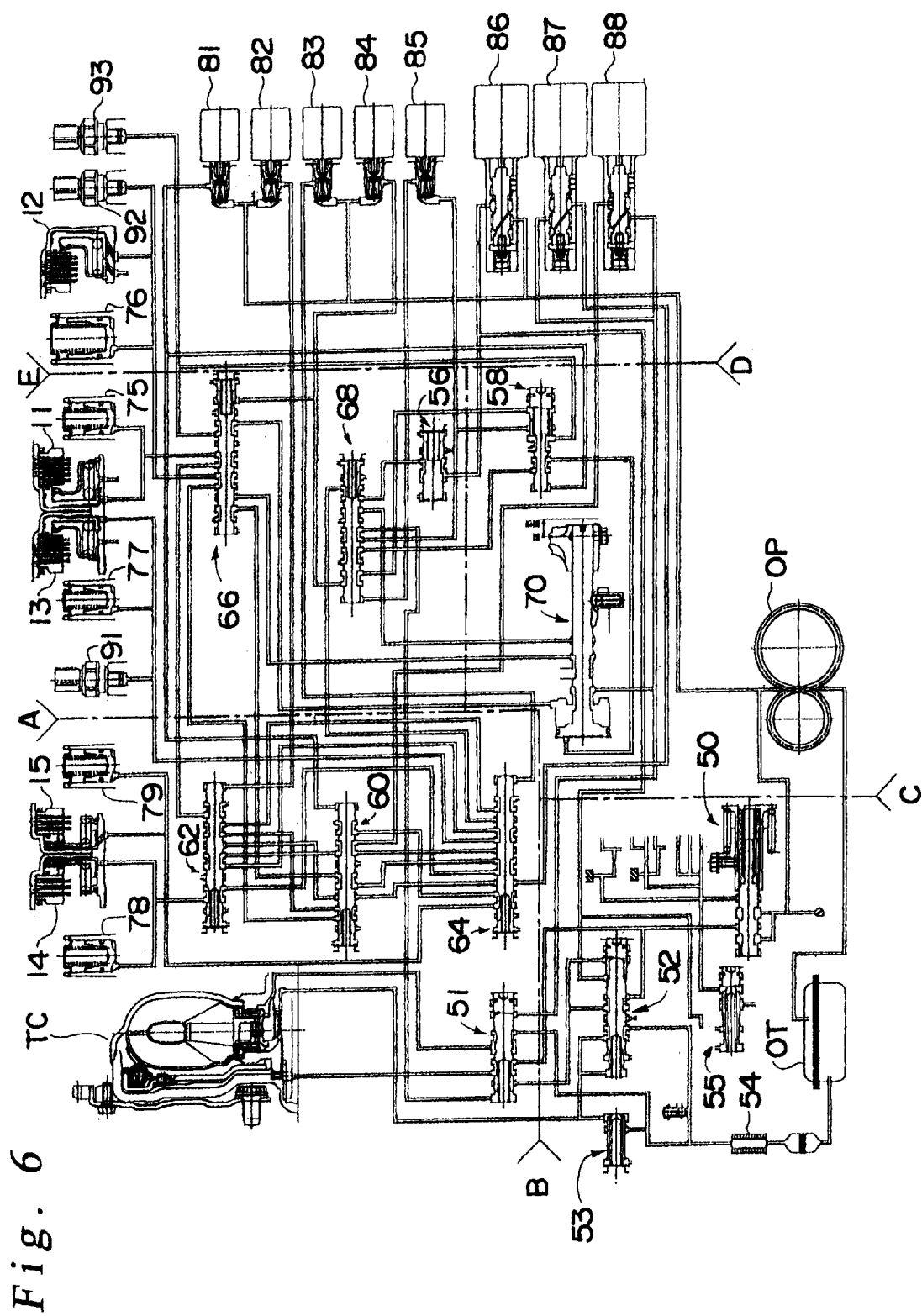
FIG. 6 is a diagram showing a hydraulic circuit which constitutes the control system according to the present invention.
Figure 7:
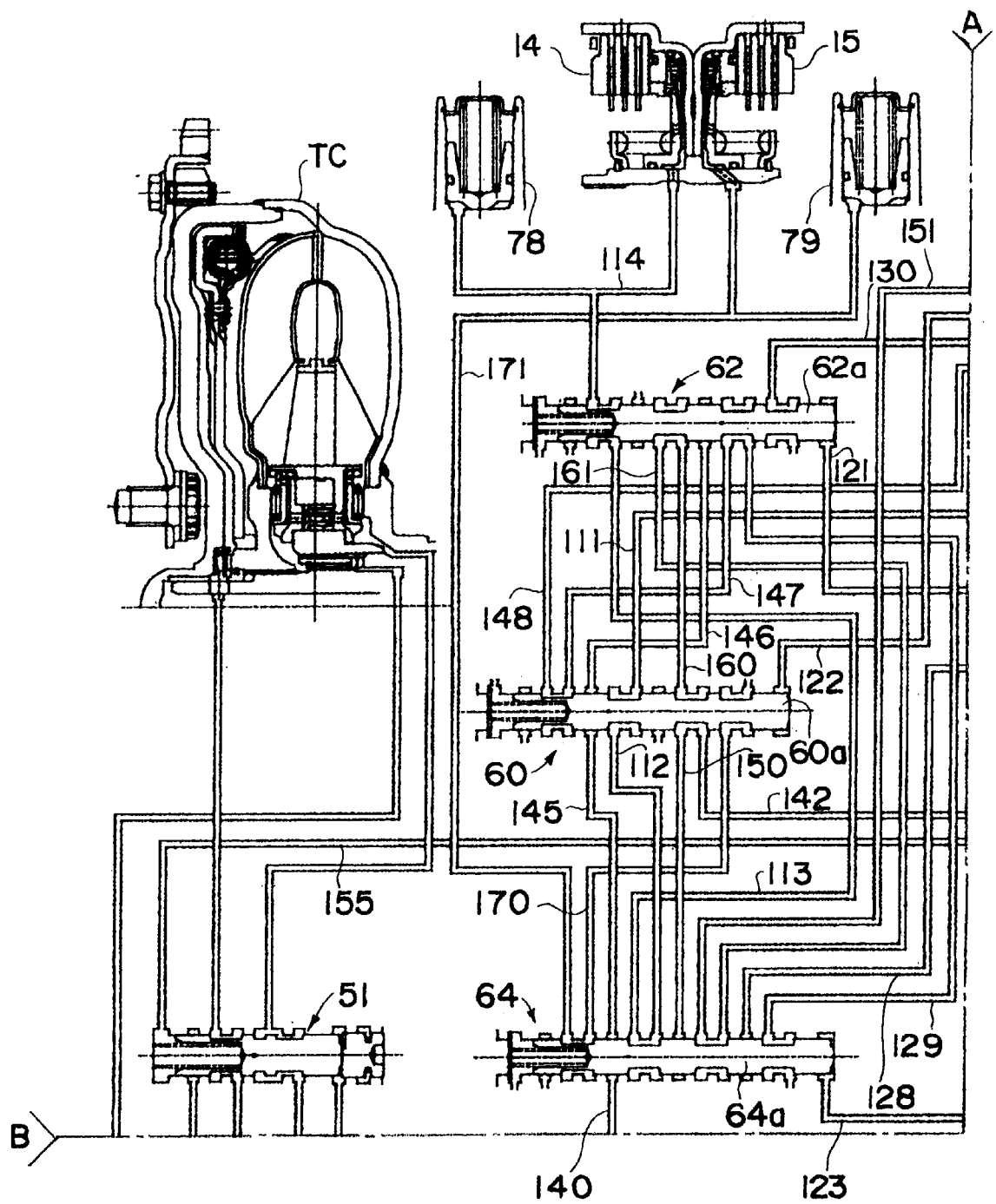
FIG. 7 is a diagram showing part of the hydraulic circuit shown in FIG. 6, in enlargement.
Figure 8:
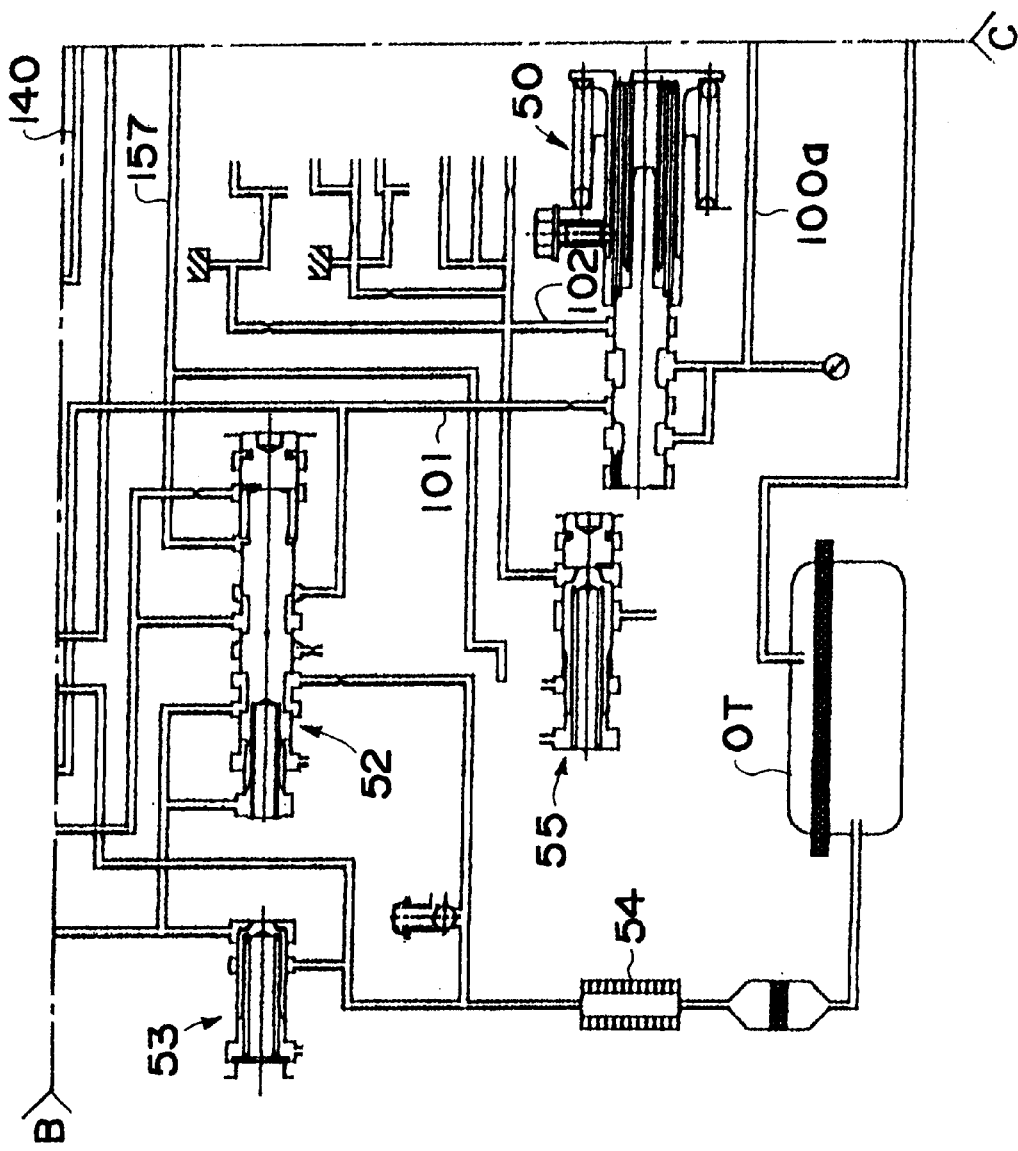
FIGS. 8~11 are diagrams, each showing part of the diagram of FIG. 6, respectively, in enlargement.
Figure 9:
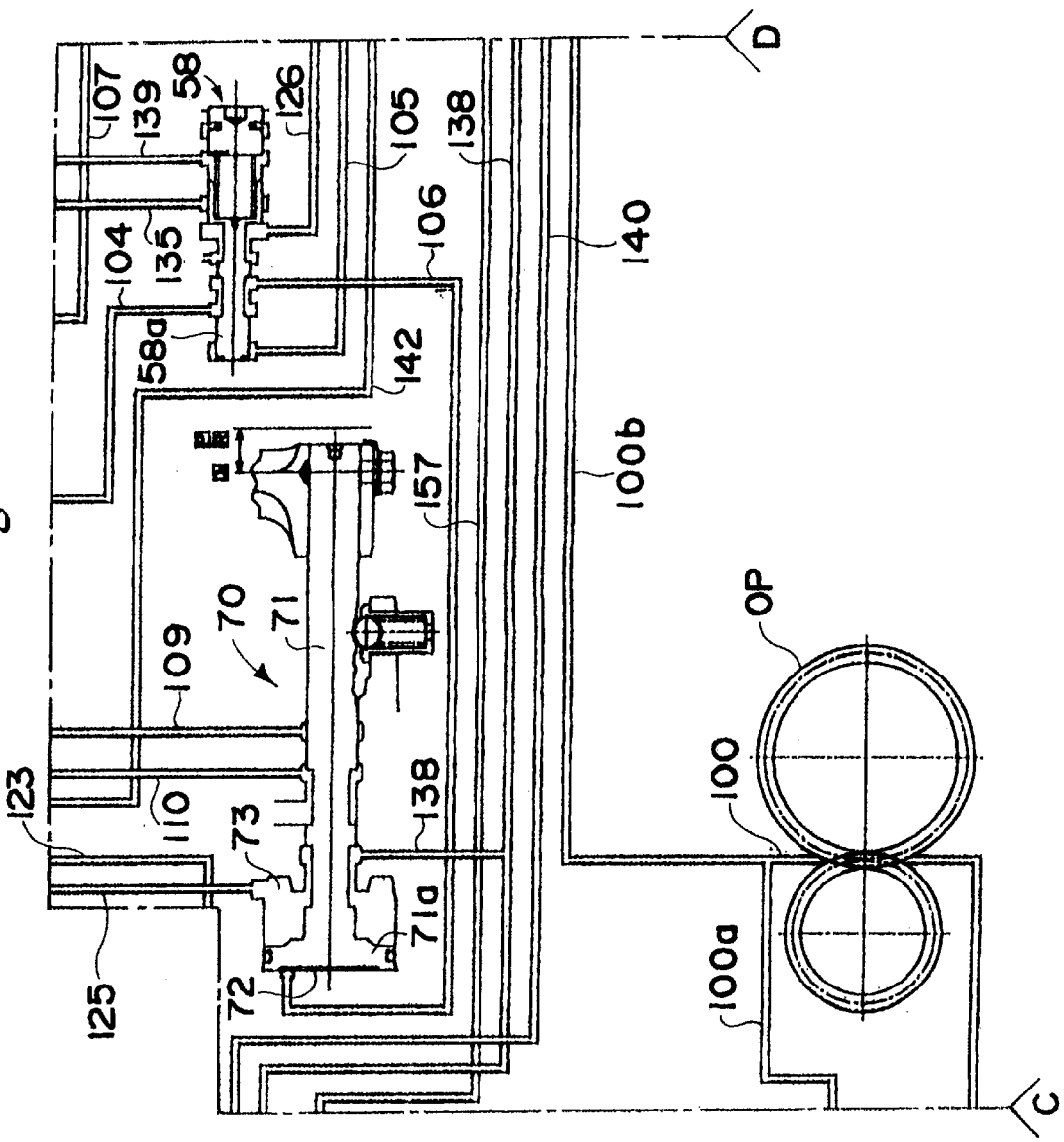
Figure 10:
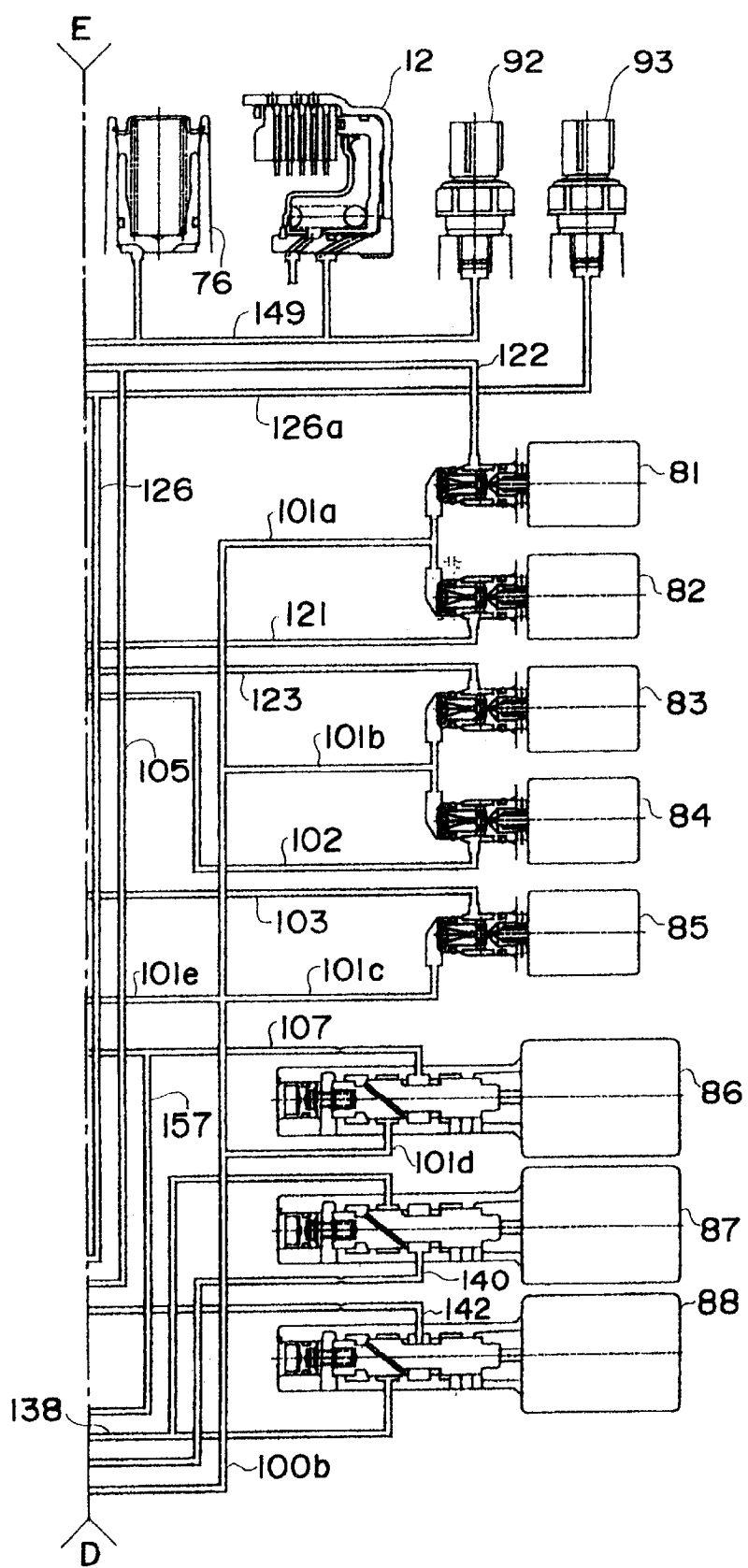
Figure 11:
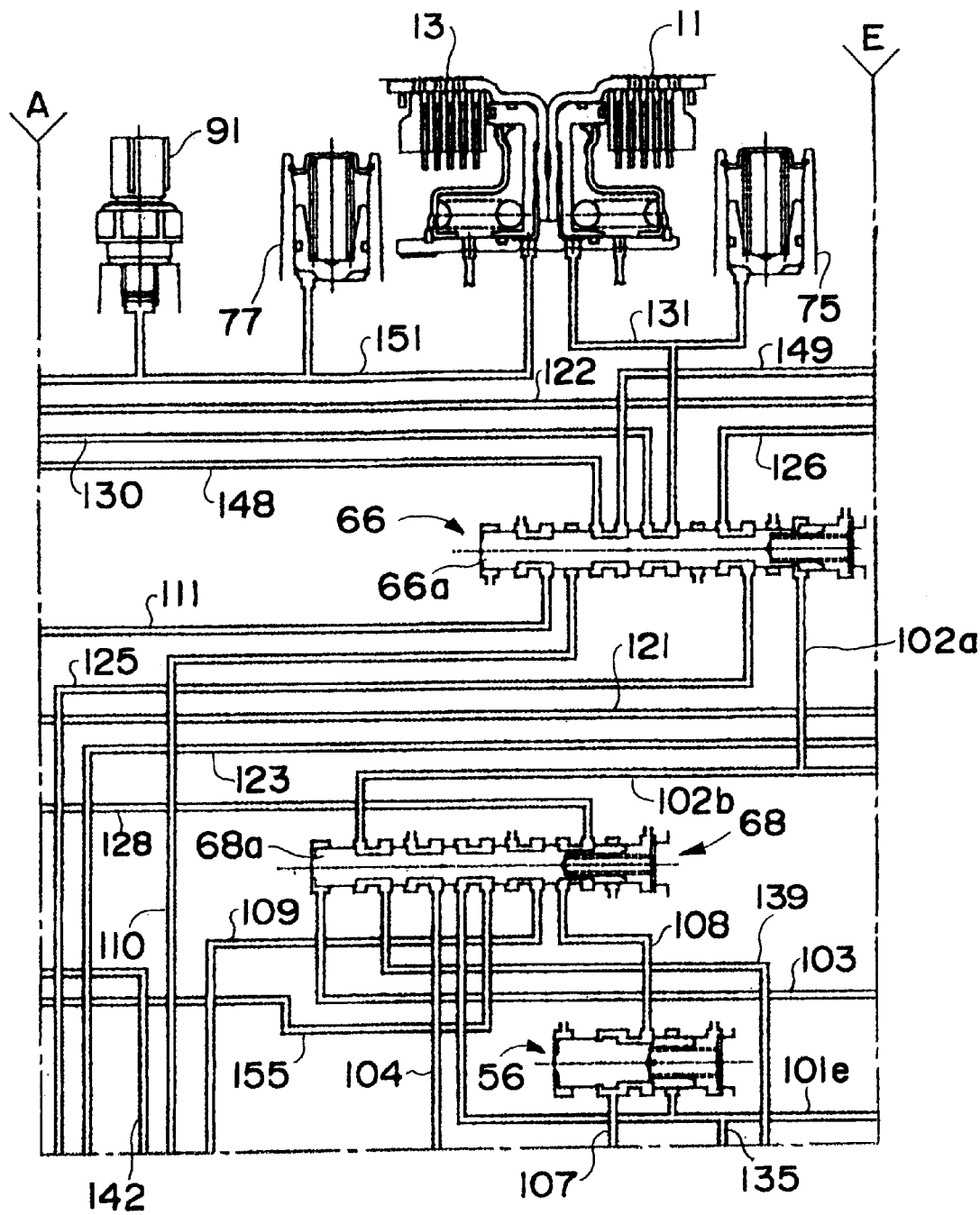

As shown in FIG. 6, a LOW accumulator 75, a SECOND accumulator 76, a THIRD accumulator 77, a FOURTH accumulator 78 and a FIFTH accumulator 79 are connected through oil passages, respectively, to the LOW clutch 11, the SECOND speed clutch 12, the THIRD speed clutch, the FOURTH speed clutch 14 and the FIFTH speed clutch 15, which constitute the automatic transmission as described above. This hydraulic circuit is also equipped with a forward/reverse selection hydraulic servomechanism 70 to operate the dog clutch 16.

Furthermore, as shown in the figure, a first shift valve 60, a second shift valve 62, a third shift valve 64, a fourth shift valve 66, a fifth shift valve 68, a CPB valve 56 and a D inhibitor valve 58 are provided to control the hydraulic pressure supplied to these clutches 11~15 and to the forward/reverse selection hydraulic servomechanism 70. To control the actuation of these valves and to control the hydraulic pressure supplied to the clutches, etc, the above mentioned first~fifth on/off solenoid valves 81~85 and the first third linear solenoid valves 86~88 are arranged appropriately.

Now, the operation of this hydraulic circuit is described for each speed change ratio, which is established when the condition of the first~fifth on/off solenoid valves 81~85 is set as listed in Table 1 below. The first~fifth on/off solenoid valves 81~85 are normally closed valves, so each valve opens to generate a signal pressure to actuates other respective valves when its solenoid is electrically energized (i.e., while it is turned ON).

TABLE 1

| | Solenoid valves | | | | | |
|---|---|---|---|---|---|---|
| | 81 | 82 | 83 | 84 | 85 | Mode |
| R | X | X | X | ○ | ○ | Reverse |
| N | ○ | ○ | ○ | ○ | ○ | First NEUTRAL |
| | ○ | X | X | ○ | X | Second NEUTRAL |
| D | ○ | ○ | ○ | ○ | X | F/S SECOND |
| | X | ○ | ○ | X | X | In-gear |
| | ○ | ○ | ○ | X | X | LOW |
| | X | ○ | ○ | X | ○/X | 1-2-3 |
| | X | ○ | X | X | ○/X | SECOND |
| | X | X | X | X | ○/X | THIRD |
| | X | X | ○ | X | ○/X | 2-3-4 |
| | ○ | X | ○ | X | ○/X | FOURTH |
| | ○ | X | X | X | ○/X | 4-5 |
| | ○ | ○ | X | X | ○/X | FIFTH |

Note:
"○" and "X" in the table represent the turning on and off of the solenoids, respectively.

At first, a description is given for the establishment of the reverse speed ratio. As shown in Table 1, the first~third on/off solenoid valves 81~83 are turned off and are closed while the fourth and fifth on/off solenoid valves 84 and 85 are turned on and are opened. In this condition, the line pressure PL which is supplied to the fourth and fifth on/off solenoid valves 84 and 85 through oil passages 101b and 101c that branch from the oil passage 100b is supplied to oil passages 102 and 103. The line pressure PL in the passage 102 acts on the right end flange portion of the fourth shift valve 66 through an oil passage 102a and shifts the spool 66a of the valve rightward (this action results in a condition opposite to that shown in the figure). The line pressure PL in the passage 103 acts on the left end of the fifth shift valve 68 and shifts the spool 68a of the valve rightward (this results in a condition opposite to that shown in the figure). As a result, an oil passage 102b that is branched from the passage 102 is blocked at the fifth shift valve 68.

On the other hand, the line pressure PL being supplied to the fifth shift valve 68 through an oil passage 101e that is branched from the passage 100b is supplied through a groove provided on the spool 68a of the fifth shift valve 68 to an oil passage 104, which leads to the D inhibitor valve 58. In this condition, because an oil passage 105 connected to the left end of the D inhibitor valve 58 is connected to a drain at the first on/off solenoid valve 81, the spool 58a of the D inhibitor valve 58 is positioned to the left side of the valve, so the passage 104 is connected with a passage 106 which is connected to the left side oil chamber 72 of the forward/reverse selection hydraulic servomechanism 70. Therefore, the line pressure PL being supplied into the left side oil chamber 72 pushes rightward the piston portion 71a of a rod 71 which is provided in the forward/reverse selection hydraulic servomechanism 70. When the rod 71, which is provided with a shift fork to operate the dog clutch 16, is shifted rightward, the dog clutch 16 engages with the reverse driven gear 26c to connect it rotationally to the countershaft 3.

As mentioned previously, the reverse drive range is established when the dog clutch 16 is engaged with the reverse driven gear 26c and the FOURTH speed clutch 14 is engaged. The engagement of the FOURTH speed clutch 14 is actuated by the first linear solenoid valve 86, to which the line pressure PL is supplied through an oil passage 101d. At the first linear solenoid valve 86, the supply of the line pressure to another oil passage 107 is adjusted by means of electrical control of the current flowing through the solenoid of the valve (pressure adjustment control).

This passage 107 is connected with another oil passage 108 through the CPB valve 56, and this oil passage 108 is connected with another oil passage 109 through a passage which is created when the spool 68a of the fifth shift valve 68 is shifted rightward. This oil passage 109 is then connected with another oil passage 110 through a passage which is created by a groove of the rod 71 of the forward/reverse selection hydraulic servomechanism 70 when the rod is shifted rightward. This oil passage 110 is then connected with another oil passage 111 through a passage which is created when the spool 66a of the fourth shift valve 66 is shifted rightward. Then, this oil passage 111 is connected with another oil passage 112 through a passage which is created when the spool 60a of the first shift valve 60 is shifted rightward. This oil passage 112 is then connected with another oil passage 113 through a passage which is created when the spool 64a of the third shift valve 64 is shifted rightward. Furthermore, this oil passage 113 is connected with another oil passage 114 through a passage which is created when the spool 62a of the second shift valve 62 is shifted rightward. This oil passage 114 is then connected to the actuation oil chamber of the FOURTH speed clutch 14 and to the FOURTH accumulator 78. In this arrangement, the engagement of the FOURTH speed clutch 14 is controlled by the first linear solenoid valve 86 for setting the reverse speed ratio.

Now, the control for establishing the neutral range is described. As shown in Table 1, the neutral range comprises first and second neutral modes. The first neutral mode takes place when the neutral range (N range) or the reverse drive range (R range) is selected while the vehicle is driving at a speed greater than a predetermined speed (e.g., 10 km/h) in the forward drive range (D range). The first neutral mode functions as a reverse inhibitor to prevent the transmission from shifting to the reverse speed ratio in such a condition. The second neutral mode takes place when the transmission shifts from the reverse drive range to the neutral range and from the forward drive range to the neutral range. Moreover, when the transmission shifts from the reverse drive range through the second neutral mode to the forward drive range, the transmission goes through the in-gear mode listed in Table 1. On the other hand, if the transmission, after having shifted from the reverse drive range to the second neutral mode, is operated to shift from the second neutral mode to the reverse drive range, the transmission shifts directly to the reverse drive range without going through the in-gear mode. In the same way, the second neutral mode takes place when the transmission shifts from the forward drive range to the reverse drive range, so the reverse drive range is established after the D inhibitor valve 58 is actuated to a reverse mode. However, if the transmission, after having shifted from the forward drive range to the second neutral mode, is operated to shift from the second neutral mode to the forward drive range, the transmission shifts directly to the forward drive range without any mode change of the D inhibitor valve 58.

In the first neutral mode, all the first~fifth on/off solenoid valves 81~85 are turned on and are open. Therefore, when the mode of the transmission is changing from the reverse speed ratio or reverse drive range to the first neutral mode, the first~third on/off solenoid valves 81~83, which have been closed for setting the reverse drive range, are now opened, and the supply of hydraulic oil through these valves starts. At first, the line pressure PL which is supplied to the first on/off solenoid valve 81 through the oil passage 101a is now led to an oil passage 122 which is connected to the right end of the first shift valve 60. With this supply of the line pressure PL, the spool 60a of the first shift valve 60 is shifted leftward. As the oil passage 122 is connected also with the oil passage 105, the line pressure is supplied also to the left end of the D inhibitor valve 58 through the passage 105. As a result, the spool 58a of the D inhibitor valve shifts rightward. In this condition, the passage 106 which is connected to the left side oil chamber 72 of the forward/reverse selection hydraulic servomechanism 70 is connected to a drain through the D inhibitor valve 58, so the hydraulic oil in the left side oil chamber 72 is drained.

In the condition where the spool 58a of the D inhibitor valve 58 is shifted to the right side thereof, the line pressure PL is supplied into the D inhibitor valve 58 through the oil passages 101e and 135, and this pressure acts on the spool 58a to maintain the spool on the right side of the valve even after the line pressure supplied from the oil passage 105 is terminated. To the D inhibitor valve 58, another oil passage 139 is arranged such that the line pressure led through this passage acts on the spool 58a to shift the spool leftward. Therefore, only when the line pressure is led through this oil passage 139, the spool 58a of the D inhibitor valve 58 can shift leftward.

Also, the line pressure supplied through the oil passage 101a to the second on/off solenoid valve 82 is now led to the oil passage 121 which is connected to the right end of the second shift valve 62. With this supply of hydraulic pressure, the spool 62a of the second shift valve 62 shifts leftward. Furthermore, the line pressure supplied through the oil passage 101b to the third on/off solenoid valve 83 is led to the oil passage 123 which is connected to the right end of the third shift valve 64. With this pressure, the spool 64a of the third shift valve 64 shifts leftward. As a result, the oil passage 114 connected to the oil chamber of the FOURTH speed clutch 14 is now connected to a drain through a groove provided on the spool of the second shift valve 62, and the FOURTH speed clutch 14 is released to set a neutral condition.

In this condition, as the spool 58a of the D inhibitor valve 58 is maintained to the right side thereof, the passage 106 connected to the left side oil chamber 72 of the forward/reverse selection hydraulic servomechanism 70 is in fluid communication to a drain at the D inhibitor valve 58. On the other hand, the line pressure is supplied into the right side oil chamber 73 of the forward/reverse selection hydraulic servomechanism 70 as the oil passage 125 which is connected to the right side oil chamber 73 is in fluid communication with the oil passage 101e through an oil passage 126, the D inhibitor valve 58 and another oil passage 135. As a result, in the first neutral mode, the rod 71 of the forward/reverse selection hydraulic servomechanism 70 is shifted and maintained to the left side, so the dog clutch 16 is shifted and maintained to a D range position. In the first neutral mode, as the forward/reverse selection hydraulic servomechanism 70 remains in this condition, i.e., at the D range position, it is not possible to establish a reverse speed ratio.

In the second neutral mode, the first and fourth on/off solenoid valves 81 and 84 are turned on and are open while the second, third and fifth on/off solenoid valves 82, 83 and 85 are turned off and are closed. In response to this actuation condition of the solenoid valves, the shift valves are set as follows: the spool 60a of the first shift valve 60 is shifted leftward, the spool 62a of the second shift valve 62 is shifted rightward, the spool 64a of the third shift valve 64 is shifted rightward, the spool 66a of the fourth shift valve 66 is shifted rightward, and the spool 68a of the fifth shift valve 68 is shifted leftward.

In this condition, as the spool 66a of the fourth shift valve 66 is shifted rightward, the oil passage 125 connected to the right side oil chamber 73 of the forward/reverse selection hydraulic servomechanism 70 is connected to a drain at the fourth shift valve 66. On the other hand, the passage 106 connected to the left side oil chamber 72 of the forward/reverse selection hydraulic servomechanism 70 is connected to a drain through the D inhibitor valve 58 and the fifth shift valve 68. As a result, without any axially acting force, the rod 71 of the forward/reverse selection hydraulic servomechanism 70 remains in the same condition which has existed before the transmission takes this second neutral mode. No force is generated in the axial direction until the spool 68a of the fifth shift valve 68 is shifted rightward.

Now, each mode for the forward drive range (D range) is described. The in-gear mode takes place, for example, when the shift lever is manipulated from the N position to the D position to engage gears, and the in-gear mode prepares the transmission to start the engagement of the LOW clutch 11. In this mode, the second and third on/off solenoid valves 82 and 83 are turned on and are open while the first, fourth and fifth on/off solenoid valves 81, 84 and 85 are turned off and are closed. In response to this actuation condition of the solenoid valves, the shift valves are set as follows: the spool 60a of the first shift valve 60 is shifted rightward, the spool 62a of the second shift valve 62 is shifted leftward, the spool 64a of the third shift valve 64 is shifted leftward, the spool 66a of the fourth shift valve 66 is shifted leftward, and the spool 68a of the fifth shift valve 68 is shifted leftward.

In the in-gear mode, the LOW clutch 11 is controlled to engage gradually by the first linear solenoid valve 86. The hydraulic pressure adjusted by the first linear solenoid valve 86 is supplied to the oil passage 107 which is connected with the oil passage 108 through the CPB valve 56. This oil passage 108 is connected with another oil passage 128 through a passage which is created when the spool 68a of the fifth shift valve 68 is shifted leftward. The oil passage 128 is then connected with another oil passage 129 through a passage which is created when the spool 64a of the third shift valve 64 is shifted leftward. Then, the oil passage 129 is connected with another oil passage 130 through a passage which is created when the spool 62a of the second shift valve 62 is shifted leftward. This oil passage 130 is then connected with another oil passage 131 through a passage which is created when the spool 66a of the fourth shift valve 66 is shifted leftward. This oil passage 131 is then connected to the oil chamber of the LOW clutch 11 and to the LOW accumulator 75. In this arrangement, the LOW clutch 11 is engaged gradually in correspondence to the activation of the first linear solenoid valve 86.

In the in-gear mode, the oil passage 125 connected to the right side oil chamber 73 of the forward/reverse selection hydraulic servomechanism 70 is connected with the oil passage 126 through a passage which is created by the leftward shift of the spool 66a of the fourth shift valve 66. This oil passage 126 is then connected with the oil passage 135 which leads to the oil passage 101e, through a passage created by the rightward shift of the spool 58a of the D inhibitor valve 58. On the other hand, the passage 106 connected to the left side oil chamber 72 of the forward/reverse selection hydraulic servomechanism 70 is connected through the D inhibitor valve 58 with the oil passage 104 which is drained at the fifth shift valve 68 whose spool 68a is shifted on the left side thereof. As a result, the line pressure PL being supplied into the right side oil chamber 73 of the forward/reverse selection hydraulic servomechanism 70 acts on the rod 71 and pushes it leftward. Therefore, in the in-gear mode, the rod 71 of the forward/reverse selection hydraulic servomechanism 70 is shifted leftward as shown in the figure, so the dog clutch 16 shifts to the D range position and engages with the FOURTH speed driven gear 24b to connect it rotationally to the countershaft 3.

Now, a description is given of the LOW mode. In the LOW mode, which is set, for example, to start the vehicle when the D range is selected, the first~third on/off solenoid valves 81~83 are turned on and are opened while the fourth and fifth on/off solenoid valves 84 and 85 are turned off and are closed. In this condition, the spool 60a of the first shift valve 60 is shifted to the left side, the spool 62a of the second shift valve 62 is shifted to the left side, the spool 64a of the third shift valve 64 is shifted to the left side, the spool 66a of the fourth shift valve 66 is shifted to the left side, and the spool 68a of the fifth shift valve 68 is shifted to the left side.

The LOW mode differs from the in-gear mode only in the actuation of the first on/off solenoid valve 81. In the LOW mode, the first on/off solenoid valve 81 is turned on, so the spool 60a of the first shift valve 60 is shifted leftward. Then, the line pressure PL being supplied from the first on/off solenoid valve 81 to the oil passage 122 is led through the oil passage 105 to the left end of the D inhibitor valve 58, so the spool 58a of the D inhibitor valve 58 is shifted rightward. In this condition, the oil passage 135 branching from the oil passage 101e, to which the line pressure PL is being supplied, is connected with the oil passage 126 through the D inhibitor valve 58, so the line pressure PL is now supplied to the D inhibitor valve 58 through the oil passage 126.

In the condition where the oil passage 135 is connected with the oil passage 126, the spool 58a of the D inhibitor valve 58 is pushed rightward by the line pressure PL being supplied, so the spool 58a remains on the right side of the valve even after the line pressure supplied through the oil passage 105 is terminated. This spool 58a remains on the right side unless the line pressure from the oil passage 139 acts on the spool 58*a* and pushes leftward, which pressure is only available when the fourth on/off solenoid valve 84 is turned on to shift the spool 68*a* of the fifth shift valve 68 rightward. Therefore, once the spool 58*a* of the D inhibitor valve 58 is shifted rightward, it remains on the right side until the fourth on/off solenoid valve 84 is turned on.

Now, the oil passage 126 is connected with the oil passage 125 through a passage created by the leftward shift of the spool 66*a* of the fourth shift valve 66, so the line pressure PL is supplied through the oil passage 125 to the right side oil chamber 73 of the forward/reverse selection hydraulic servomechanism 70. As a result, the rod 71 in this valve is shifted leftward, so the dog clutch 16 is positioned at the D range position, engaging with the FOURTH speed driven gear 24*b* and connecting it rotationally to the countershaft 3. In the condition where the rod 71 is on the left side, the right side oil chamber 73 is connected to an oil passage 138 through which the line pressure PL is supplied to the second and third linear solenoid valves 87 and 88. Now, the line pressure PL is adjustable with the second and third linear solenoid valves 87 and 88, and this adjusted pressure can be supplied as control pressures to oil passages 140 and 142, respectively. However, no control pressure is output from these linear solenoid valves 87 and 88 in the LOW mode.

In the LOW mode, the control pressure being supplied from the first linear solenoid valve 86 to the oil passage 107 is led to the LOW clutch 11 in the same way as in the in-gear mode. Therefore, the engagement of the LOW clutch 11 is controlled in correspondence to the actuation of the first linear solenoid valve 86.

Now, a description is given of the 1-2-3 mode. This mode is set to shift the speed ratio of the transmission among the first (LOW), second, and THIRD speed ratios, i.e., to control the transition of speed ratio change. In this mode, the second and third on/off solenoid valves 82 and 83 are turned on and are opened while the first and fourth on/off solenoid valves 81 and 84 are turned off and are closed. The fifth on/off solenoid valve 85 is turned off when the FIRST speed ratio is established, and it is turned on or off in lock-up clutch actuation control (no description is provided on this control because it is not relevant to the present invention) when the second or THIRD speed ratio is established. In the 1-2-3 mode, the spool 60*a* of the first shift valve 60 is shifted rightward, the spool 62*a* of the second shift valve 62 is shifted leftward, the spool 64*a* of the third shift valve 64 is shifted leftward, and the spool 66*a* of the fourth shift valve 66 is shifted leftward.

As the fourth on/off solenoid valve 84 is turned off, the spool 58*a* of the D inhibitor valve 58 is maintained to the right side. In this condition, the line pressure PL is supplied to the right side oil chamber 73 of the forward/reverse selection hydraulic servomechanism 70, so the dog clutch 16 is maintained at the D range position. In this condition, the line pressure PL is supplied through the oil passage 138 to the second and third linear solenoid valves 87 and 88.

In this mode, the engagement of the LOW clutch 11, the SECOND speed clutch 12 or the THIRD speed clutch 13 is controlled in correspondence to the actuation of the first, second and third linear solenoid valve 86, 87 and 88. The control pressure being supplied from the first linear solenoid valve 86 to the oil passage 107 is led to the oil passage 108 through the CPB valve 56. This oil passage 108 is connected with the oil passage 128 through the fifth shift valve 68, and this oil passage 128 is connected with the oil passage 129 through the third shift valve 64. Then, this oil passage 129 is connected with the oil passage 130 through the second shift valve 62, and this oil passage 130 is connected with the oil passage 131 through the fourth shift valve 66. This oil passage 131 is then connected to the LOW clutch 11. In this condition, the engagement of the LOW clutch 11 is controlled by means of the control pressure supplied from the first linear solenoid valve 86.

The primary pressure of the second linear solenoid valve 87 is the pressure supplied through the oil passage 138, which pressure is supplied only when the forward/reverse selection hydraulic servomechanism 70 is set at the D range position. This primary pressure is adjusted by the second linear solenoid valve 87 to a control pressure which is supplied to an oil passage 140. In this present condition, this oil passage 140 is connected through the third shift valve 64 with an oil passage 145, which is connected with an oil passage 146 through the first shift valve 60. This oil passage 146 is then connected with another oil passage 147 through the second shift valve 62, and this oil passage 147 is then connected with another oil passage 148 through the first shift valve 60. Then, this oil passage 148 is connected with another oil passage 149 through the fourth shift valve 66, and this oil passage 149 is connected to the SECOND speed clutch 12, a hydraulic switch 92 and the SECOND accumulator 76. In this arrangement, the control pressure from the second linear solenoid valve 87 is utilized for the engagement control of the SECOND speed clutch 12. In addition, the hydraulic switch 92 is turned on for confirmation that the forward/reverse selection hydraulic servomechanism 70 is at the D range position.

The control pressure generated at the third linear solenoid valve 88 is supplied to the oil passage 142 which is connected with another oil passage 150 through the first shift valve 60. This oil passage 150 is connected through the third shift valve 64 with another oil passage 151 which is connected to the THIRD speed clutch 13 and the THIRD accumulator 77. As a result, the control pressure form the third linear solenoid valve 88 is utilized for the engagement control of the THIRD speed clutch 13.

Now, a description is given of the SECOND mode, which is set for the engagement of the SECOND speed clutch 12. In this mode, the second on/off solenoid valve 82 is turned on and is opened while the first, third and fourth on/off solenoid valves 81, 83 and 84 are turned off and are closed. The fifth on/off solenoid valve 85 is turned on or off depending upon the condition of the lock-up clutch actuation control. In this condition, the spool 60*a* of the first shift valve 60 is shifted rightward, the spool 62*a* of the second shift valve 62 is shifted leftward, the spool 64*a* of the third shift valve 64 is shifted rightward, and the spool 66*a* of the fourth shift valve 66 is shifted leftward.

As the fourth on/off solenoid valve 84 is turned off also in this mode, the spool 58*a* of the D inhibitor valve 58 is maintained on the right side. Therefore, the line pressure PL is supplied to the right side oil chamber 73 of the forward/ reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the SECOND speed clutch 12 is controlled by the control pressure supplied from the second linear solenoid valve 87 to the oil passage 140. This oil passage 140 is connected through the third shift valve 64 with the oil passage 145, which is connected with the oil passage 146 through the first shift valve 60. This oil passage 146 is then connected with the oil passage 147 through the second shift valve 62, and this oil passage 147 is connected with the oil passage 148 through the first shift valve 60. Furthermore, this oil passage 148 is connected with the oil passage 149 through the fourth shift valve 66, and this oil passage 149 is connected to the SECOND speed clutch 12 and to the SECOND accumulator 76. In this arrangement, the engagement of the SECOND speed clutch 12 is controlled by the control pressure supplied from the second linear solenoid valve 87.

Here, the control of the lock-up clutch performed by the fifth on/off solenoid valve 85 is described briefly. By the turning on or off of this solenoid valve 85, the position of the spool 68a of the fifth shift valve 68 is controlled leftward or rightward, respectively. In the condition where this spool 68a is shifted leftward, the oil passage 101e is connected with another oil passage 155, and the line pressure PL is supplied to the left end of the lock-up shift valve 51. On the other hand, in the condition where the spool 68a is shifted rightward, the oil passage 155 is connected to a drain at the fifth shift valve 68, so no pressure is supplied to the left end of the lock-up shift valve 51. In this way, the turning on and off of the fifth on/off solenoid valve 85 is utilized for the control of the actuation of the lock-up shift valve 51.

The lock-up shift valve 51 is a valve to turn on or off the lock-up actuation, and the engagement of the lock-up clutch is controlled by the control pressure supplied from the first linear solenoid valve 86. The control pressure from the first linear solenoid valve 86 is led to the oil passage 107, which is connected through another oil passage 157 to the lock-up control valve 52. Thus, the actuation of the lock-up control valve 52, which is controlled by the control pressure from the first linear solenoid valve 86, controls the engagement of the lock-up clutch. This engagement control of the lock-up clutch is carried out in the same way for the speed change ratios which are equal to or higher than the SECOND speed ratio.

Now, a description is given of the THIRD mode, which is set for the engagement of the THIRD speed clutch 13. In this mode, the first fourth on/off solenoid valves 81~84 are turned off and are closed. The fifth on/off solenoid valve 85 is turned on or off depending upon the condition of the lock-up clutch actuation control as in the above described mode. In this condition, the spool 60a of the first shift valve 60 is shifted rightward, the spool 62a of the second shift valve 62 is shifted rightward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the THIRD speed clutch 13 is controlled by the control pressure supplied from the third linear solenoid valve 88 to the oil passage 142, which is connected with another oil passage 160 through the first shift valve 60. This oil passage 160 is then connected with another oil passage 161 through the second shift valve 62, and this oil passage 161 is then connected through the third shift valve 64 with the oil passage 151, which is connected to the THIRD speed clutch 13 and to the THIRD accumulator 77. In this arrangement, the engagement of the THIRD speed clutch 13 is controlled by the control pressure from the third linear solenoid valve 88.

Now, a description is given of the 2-3-4 mode. This mode is set to shift the speed ratio of the transmission among the SECOND, THIRD and FOURTH speed ratios, i.e., to control the transition of speed ratio change. In this mode, the third on/off solenoid valve 83 is turned on and is opened while the first, second and fourth on/off solenoid valves 81, 82 and 84 are turned off and are closed. The fifth on/off solenoid valve 85 is used in the lock-up clutch actuation control as briefly described above. In the 2-3-4 mode, the spool 60a of the first shift valve 60 is shifted rightward, the spool 62a of the second shift valve 62 is shifted rightward, the spool 64a of the third shift valve 64 is shifted leftward, and the spool 66a of the fourth shift valve 66 is shifted leftward.

Also in this mode, as the fourth on/off solenoid valve 84 is turned off, the spool 58a of the D inhibitor valve 58 is maintained on the right side thereof. In this condition, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the SECOND speed clutch 12, the THIRD speed clutch 13 and the FOURTH speed clutch 14 is controlled in correspondence to the actuation of the first, second and third linear solenoid valves 86, 87 and 88 to shift the transmission smoothly among these speed change ratios.

The control pressure supplied from the first linear solenoid valve 86 to the oil passage 107 is led to the oil passage 108 through the CPB valve 56. This oil passage 108 is connected through the fifth shift valve 68 with the oil passage 128, which is connected with the oil passage 129 through the third shift valve 64. Then, this oil passage 129 is connected with the oil passage 147 through the second shift valve 62, and this oil passage 147 is connected with the oil passage 148 through the first shift valve 60. This oil passage 148 is then connected through the fourth shift valve 66 with the oil passage 149, which is connected to the SECOND speed clutch 12. In this arrangement, the engagement of the SECOND speed clutch 12 is controlled by the control pressure supplied from the first linear solenoid valve 86.

The control pressure from the second linear solenoid valve 87 is led to the oil passage 140, which is connected with the oil passage 113 through the third shift valve 64. This oil passage 113 is connected with the oil passage 114 through the second shift valve 62, and this oil passage 114 is connected to the FOURTH speed clutch 14 and to the FOURTH accumulator 78. In this arrangement, the engagement of the FOURTH speed clutch 14 is control by the control pressure supplied from the second linear solenoid valve 87.

The control pressure from the third linear solenoid valve 88 is supplied to the oil passage 142, which is connected with the oil passage 150 through the first shift valve 60. This oil passage 150 is then connected with the oil passage 151 through the third shift valve 64, and then this oil passage 151 is connected to the THIRD speed clutch 13 and to the THIRD accumulator 77. In this arrangement, the engagement control of the THIRD speed clutch 13 is controlled by the control pressure form the third linear solenoid valve 88.

Now, a description is given of the FOURTH mode, which is set for the engagement of the FOURTH speed clutch 14.

In this mode, the first and third on/off solenoid valves 81 and 83 are turned on and are opened while the second and fourth on/off solenoid valves 82 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted rightward, the spool 64a of the third shift valve 64 is shifted leftward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. The line pressure PL is also supplied through the oil passage 138 to the second and third linear solenoid valves 87 and 88.

In this mode, the engagement of the FOURTH speed clutch 14 is controlled by the control pressure supplied from the second linear solenoid valve 87 to the oil passage 140, which is connected with the oilpassage 113 through the third shift valve 64. This oil passage 113 is connected with the oil passage 114 through the second shift valve 62, and this oil passage 114 is then connected to the FOURTH speed clutch 14 and to the FOURTH accumulator 78. In this arrangement, the engagement of the FOURTH speed clutch 14 is controlled by the control pressure from the second linear solenoid valve 87.

Now, a description is made of the 4–5 mode, which is set to shift the speed ratio of the transmission between the FOURTH and FIFTH speed ratios, i.e., to control the transition of speed ratio change. In this mode, the first on/off solenoid valve 81 is turned on and is opened while the second fourth on/off solenoid valves 82, 83 and 84 are turned off and are closed. The fifth on/off solenoid valve 85 is used in the lock-up clutch actuation control. In the 4–5 mode, the spool 60a of the first shift valve 60 is shifted leftward, the spool 62a of the second shift valve 62 is shifted rightward, the spool 64a of the third shift valve 64 is shifted rightward, and the spool 66a of the fourth shift valve 66 is shifted leftward.

Also in this mode, as the fourth on/off solenoid valve 84 is turned off, the spool 58a of the D inhibitor valve 58 is retained on the right side thereof. In this condition, the line pressure PL is supplied to the right side oil chamber 73 of the forward/reverse selection hydraulic servomechanism 70, so the dog clutch 16 is retained at the D range position. Furthermore, the line pressure PL is supplied through the oil passage 138 to the second and third linear solenoid valves 87 and 88.

In this mode, the engagement of the FOURTH speed clutch 14 and of the FIFTH speed clutch 15 is controlled in correspondence to the actuation of the second and third linear solenoid valves 87 and 88, respectively, to change the speed ratio of the transmission smoothly.

The control pressure from the second linear solenoid valve 87 is led to the oil passage 140. This oil passage 140 is connected with the oil passage 113 through the third shift valve 64, and this oil passage 113 is connected through the second shift valve 62 with the oil passage 114, which is connected to the FOURTH speed clutch 14 and to the FOURTH accumulator 78. In this arrangement, the engagement of the FOURTH speed clutch 14 is controlled by the control pressure from the second linear solenoid valve 87.

On the other hand, the control pressure from the third linear solenoid valve 88 is led to the oil passage 142, which is connected with another oil passage 170 through first shift valve 60. This oil passage 170 is then connected through the third shift valve 64 with another oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

Now, a description is made of the FIFTH mode, which is set for the engagement of the FIFTH speed clutch 15. In this mode, the first and second on/off solenoid valves 81 and 82 are turned on and are opened while the third and fourth on/off solenoid valves 83 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted leftward, the spool 64a of the third shift valve 64 is shifted rightward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. The line pressure PL is also supplied through the oil passage 138 to the second and third linear solenoid valves 87 and 88.

In this mode, the engagement of the FIFTH speed clutch 15 is controlled by the control pressure supplied from the third linear solenoid valve 88 to the oil passage 142, which is connected with the oil passage 170 through the first shift valve 60. This oil passage 170 is connected through the third shift valve 64 with the oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

As described above, each mode is established by controlling the turning on and off of the first~fifth on/off solenoid valves 81~85 as listed in Table 1. The alphabets on the left side of Table 1, "R", "N" and "D", represent the reverse drive range, the neutral range and the forward drive range, respectively, which are switched one after another in correspondence to the manipulation of the shift lever at the driver's seat. For example, in a case where the shift lever is manipulated to shift the range setting of the transmission from the R range through the N range to the D range, at first, the second neutral mode is set as the N range. In this N range condition, the rod 71 of the forward/reverse selection hydraulic servomechanism 70 is retained at the reverse drive position without any force acting in the axial direction. Thereafter, when the shift lever is manipulated to the D range, the control system proceeds to set the transmission into the in-gear mode and then into the LOW mode.

On the other hand, in a case where the shift lever is manipulated to switch the range of the transmission from the D range to the N range and then from the N range to the R range, if the speed of the vehicle at the time of the switching to the N range is less than a critical speed or predetermined speed (e.g., 10 km/h), then the control system sets the second neutral mode. In this N range condition, the rod 71 of the forward/reverse selection hydraulic servomechanism 70 is retained at the forward drive position without any force acting in the axial direction. Thereafter, when the shift lever is manipulated to the R range, the control system proceeds to set the transmission into the REVERSE mode.

On the other hand, if the speed of the vehicle at the time of the switching to the N range is equal to or more than the critical speed, then the control system sets the first neutral mode. As described above, in this mode, the rod 71 of the forward/reverse selection hydraulic servomechanism 70 is retained at the forward drive position with a force acting in the axial direction toward the forward drive position, which force is generated by the line pressure supplied into the right side oil chamber 73. In this condition, even if a solenoid valve malfunctions and engages a corresponding clutch, the reverse speed ratio cannot be established. When the speed of the vehicle decreases below the critical speed, the first neutral mode is switched to the second neutral mode. However, if the shift lever is manipulated to set the R range while the vehicle is driving still at a speed equal to or more than the critical speed, then the control system retains the first neutral mode and does not proceed to set the REVERSE mode, i.e., the control system provides the above mentioned inhibitor function. Thereafter, when the vehicle speed decreases below the critical speed, the control system proceeds to set the transmission into the REVERSE mode.

Finally, a description is made of the F/S (Fail Safe) SECOND mode. This mode is set to secure a certain driving performance by fixing the transmission to the SECOND speed ratio when the transmission experiences a breakdown. In this mode, the first~fourth on/off solenoid valves 81~84 are turned on and are opened while the fifth on/off solenoid valve 85 is turned off and is closed. In this condition, the spool 60a of the first shift valve 60 is shifted leftward, the spool 62a of the second shift valve 62 is shifted leftward, the spool 64a of the third shift valve 64 is shifted leftward, the spool 66a of the fourth shift valve 66 is shifted rightward, and the spool 68a of the fifth shift valve 68 is shifted leftward.

In this mode, the engagement of the SECOND speed clutch 12 is controlled by the control pressure supplied from the first linear solenoid valve 86 to the oil passage 107, which is connected with the oil passage 108 through the CPB valve 56. This oil passage 108 is connected with the oil passage 128 through the fifth shift valve 68, and this oil passage 128 is connected with the oil passage 129 through the third shift valve 64. This oil passage 129 is then connected with the oil passage 130 through the second shift valve 62, and this oil passage 130 is connected through the fourth shift valve 66 with the oil passage 149, which is connected to the SECOND speed clutch 12 and to the SECOND accumulator 76. In this arrangement, the engagement of the SECOND speed clutch 12 is controlled by the control pressure supplied from the first linear solenoid valve 86.

It can be understood from the above description that the engagement of the second FIFTH speed clutches 12~15 are controlled for setting the SECOND mode and higher modes (excluding the F/S mode), respectively, by the control pressures which are supplied from the second and third linear solenoid valves 87 and 88. The primary pressures supplied to the second and third linear solenoid valves 87 and 88 are led through the forward/reverse selection hydraulic servomechanism 70. For example, if the forward/reverse selection hydraulic servomechanism 70 experiences an operational failure, then these clutches cannot be controlled systematically. However, the engagement of the SECOND speed clutch 12 in the F/S (Fail Safe) SECOND mode is controlled by the first linear solenoid valve 86, which utilizes the line pressure PL being supplied directly from the oil passage 100b bypassing the forward/reverse selection hydraulic servomechanism 70. Therefore, the SECOND speed ratio can be established regardless of any operational failure of the forward/reverse selection hydraulic servomechanism 70.

Figure 12:
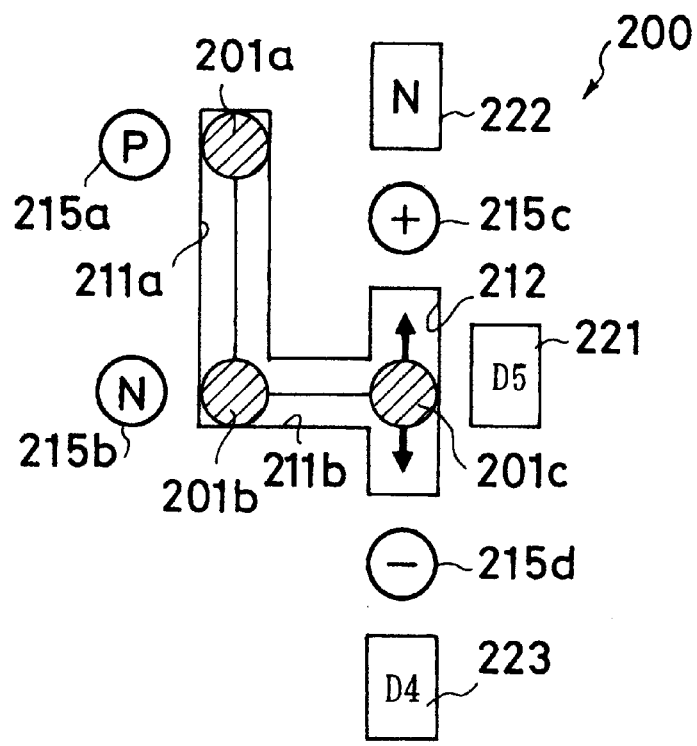
FIG. 12 is a schematic diagram of a shift manipulation unit.

Now, the shift manipulation unit 200 will be described in reference to FIG. 12. As shown in FIG. 1, the shift manipulation unit 200 comprises a shift box 210 and a shift lever 201, which is provided pivotally in the shift box 210 and has a knob 202 at the top thereof. As shown in FIG. 12, the shift box 210 is provided with a first shift guide path 211 (211a and 211b) and a second shift guide path 212 in a form of slot, through which the shift lever 201 extrudes out of the shift box 210. The first shift guide path 211 extends forward and laterally in an "L" figure, and the second shift guide path 212 which is connected with the first shift guide path 211 extends forward and rearward as shown in the figure.

Therefore, the driver can grip the knob 202 and manipulate the shift lever 201 along the first and second shift guide paths 211 and 212 pivotally in the shift box 210. The shift manipulation unit 200 is provided with five position detection switches to detect the following positions or movements of the shift lever 201 manipulated by the driver: "P" position (parking position indicated with 201a in the figure), "N" position (neutral position indicated with 201b), "S" position (selection position indicated with 201c), "+" side (upward from the "S" position in the figure) and "−" side (downward from the "S" position in the figure).

Four position marks are provided on the shift box 210: position mark "P" 215a, position mark "N" 215b, position mark "+" 215c and position mark "−" 215d to indicate the respective positions. In addition, three indicators are provided as shown in the figure to indicate the condition achieved by the manipulation of the shift lever: first indicator 221 for "A" indication, second indicator 222 for "B" indication and third indicator 223 for "C" indication.

Figure 13:
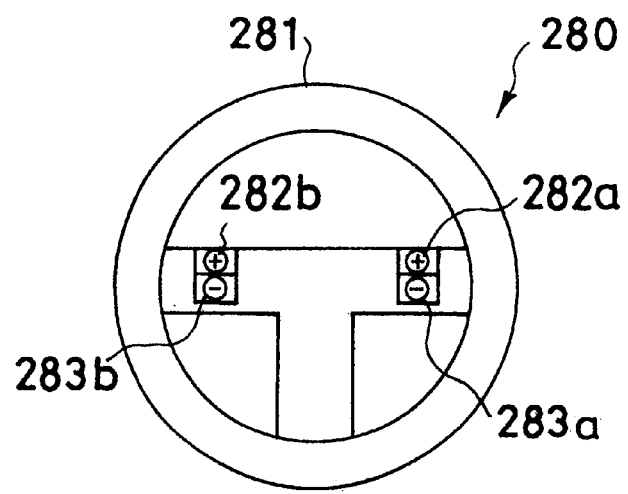
FIG. 13 is a schematic diagram of a shift manipulation switching unit.

Now, the shift manipulation switching unit 280 will be described in reference to FIG. 13. This unit comprises "+" shift switches 282a and 282b and "−" shift switches 283a and 283b, which are provided on the right and left sides at the central part of the steering wheel 281. The turning on of a "+" switch 282a or 282b on either side of the steering wheel causes to generate the same control signal as is generated when the shift lever 201 at the "S" position is swiveled onto the "+" side. Also, the turning on of a "−" switch 283a or 283b on either side causes to generate the same control signal as is generated when the shift lever 201 at the "S" position is swiveled onto the "−" side. However, the turning on of these switches 282a, 282b, 283a and 283b will not generate any control signal that effects the transmission to switch into the R range or the N range. This will be described more in detail, later.

Figure 14:
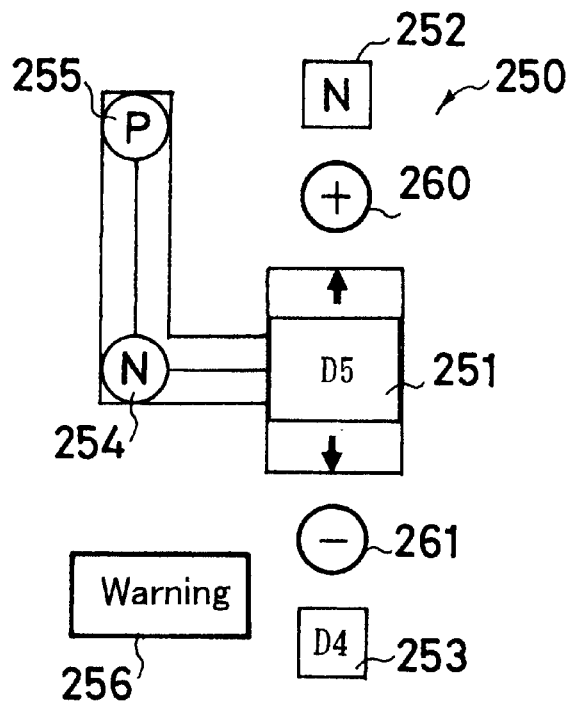
FIG. 14 is a schematic diagram of a shift indicator unit.

Now, the shift indicator unit 250 will be described in reference to FIG. 14. This unit is to display some information on the instrument panel in response to the shift manipulation performed by the driver. The shift indicator unit 250 comprises a fourth indicator 251 for "A" indication, a fifth indicator 252 for "B" indication, a sixth indicator 253 for "C" indication, a seventh indicator 254 for "D" indication, an eighth indicator 255 for "E" indication and a ninth indicator 256 for a warning indication. In addition, a "+" mark 260 and a "−" mark 261 are provided as fixed indications.

The operations of the above described shift manipulation unit 200, shift indicator unit 250 and shift manipulation switching unit 280 are controlled by the electronic control unit ECU, which is connected to these units. Now, this control is described in reference to FIGS. 15 and 16. FIG. 15 shows the positions of the shift lever 201, which is moved along the first shift guide path 211 and the second shift guide path 212, and it also shows the functions performed at these respective positions. When the shift lever 201 is at the "P" position, the transmission is set in the neutral range, and a parking gear provided in the transmission is fixed stationary to keep the vehicle in a parked condition. When the shift lever 201 is moved to the "N" position, the parking gear is released, but the transmission is kept in the neutral range.

Even though the shift lever 201 is moved from the "N" position to the "S" position, the transmission is still kept in the neutral range. From the "S" position, each movement of the shift lever 201 to the "+" side or to the "−" side along the second shift guide path 212 effects an upshift or a downshift in steps. FIG. 16 shows a shift pattern which is effected by the manipulation of the shift lever and the operation of the shift switches. For example, if the shift lever 201 is moved once to the "+" side when the transmission is in the neutral range, then the transmission is shifted into the R (reverse) range. On the other hand, if the shift lever 201 is moved repeatedly to the "−" side, then the transmission will be shifted into a "D5" range, a "D4" range, a "D'" range, a "2" range and a "1" range, sequentially in response to each movement of the shift lever to the "−" side. However, if the shift lever is moved to the "+" side when the transmission is in the R range, the transmission remains in the R range. In the same way, if the shift lever is moved to the "−" side when the transmission is in the "1" range, the transmission remains in the "1" range.

In the "D5" range, the automatic speed change of the transmission is controlled in the LOW (FIRST) mode, the SECOND mode, the THIRD mode, the FOURTH mode and the FIFTH mode (1–2–3–4–5 automatic speed change). In the "D4" range, the automatic speed change is controlled in the LOW mode, the SECOND mode, the THIRD mode and the FOURTH mode (1–2–3–4 automatic speed change), and in the "D3" range, the automatic speed change is controlled in the LOW mode, the SECOND mode and the THIRD mode (1–2–3 automatic speed change).

The shift control system allows the above described switching of the drive ranges while the vehicle speed, which is detected continuously, is equal to or lower than a predetermined speed (for example, about 10 km/h). However, if the vehicle is driving at a speed higher than the predetermined speed, then the shift control system prohibits the switching between the N range and the R range and the switching from the "D5" range to the N range (but the switching from the N range to the "D5" range is allowed). Such shift patterns are described in FIG. 17.

Moreover, similar shift patterns can be effected by the operation of the switches of the shift manipulation switching unit 280. As shown in FIGS. 15 and 16, the R range and the N range are not allowed to be established by the operation of the shift manipulation switching unit 280. However, the switching in steps from the "1" range to the "D5" range can be achieved by the operation of the "+" switches (this operation is hereinafter referred to as "+" operation) while the switching in steps from the "D5" range to the "1" range can be achieved by the operation of the "-" switches (this operation is hereinafter referred to as "−" operation).

When the ranges are shifted by the manipulation of the shift lever 201 in the above described way, the shift indicator unit 250 including the first through eighth indicators operate in the following way in correspondence with the shift manipulation unit 200. The "A" indication shows the current range, the "B" indication shows the range to be selected by the "+" operation, the "C" indication shows the range to be selected by the "−" operation, the "D" indication shows that the shift lever 201 is at the "N" position, and the "E" indication shows that the shift lever 201 is at the "P" position. As mentioned previously, the "A" indication is performed with the first indicator 221 and the fourth indicator 251, the "B" indication is performed with the second indicator 222 and the fifth indicator 252, the "C" indication is performed with the third indicator 223 and the sixth indicator 253, the "D" indication is performed with the seventh indicator 254, and the "E" indication is performed with the eighth indicator 255.

Figure 18:
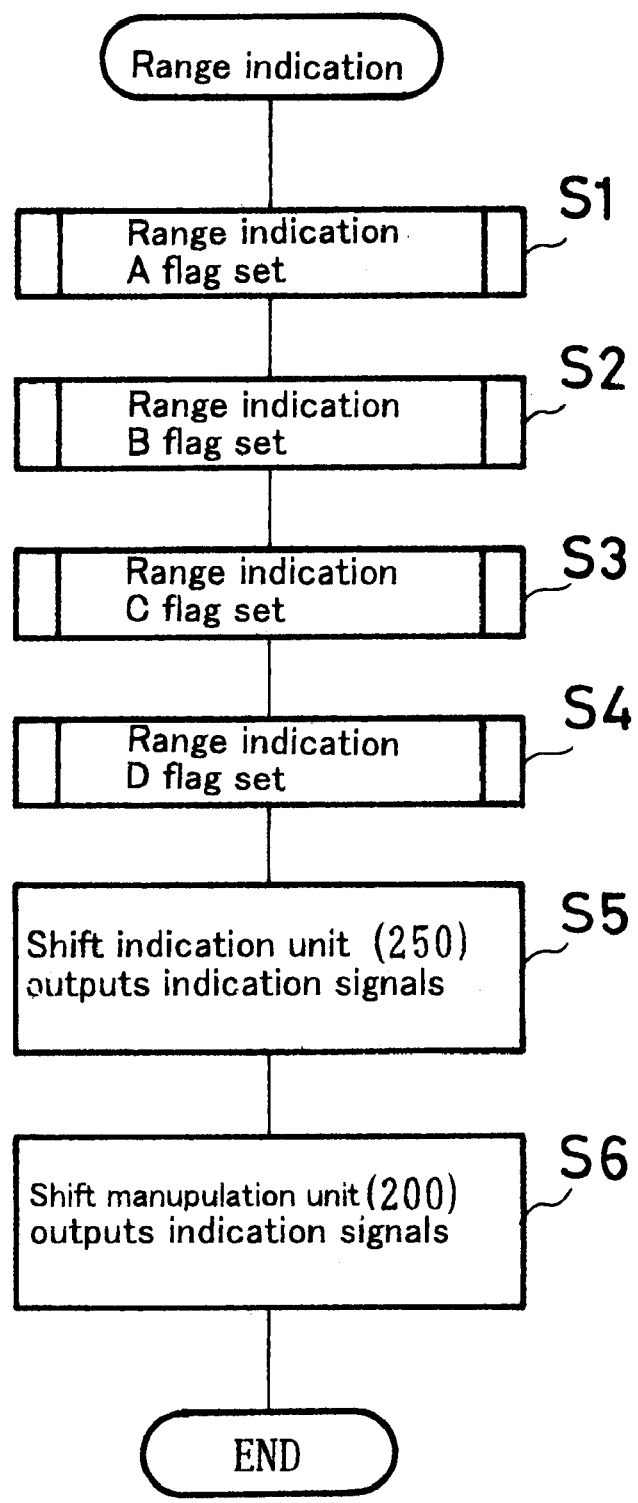
FIG. 18 is a flowchart showing steps of an indication control for an shift indicator unit.

FIG. 18 shows a control flow used for the activation of these indicators. In this control flow, flags for the "A" "D" indications are set at Step S1~S4, and, based on the conditions of these flags, the actual indications are made on the shift indicator unit 250 (Step S5) and on the shift box 210 of the shift manipulation unit 200 (Step S6).

Figure 19:
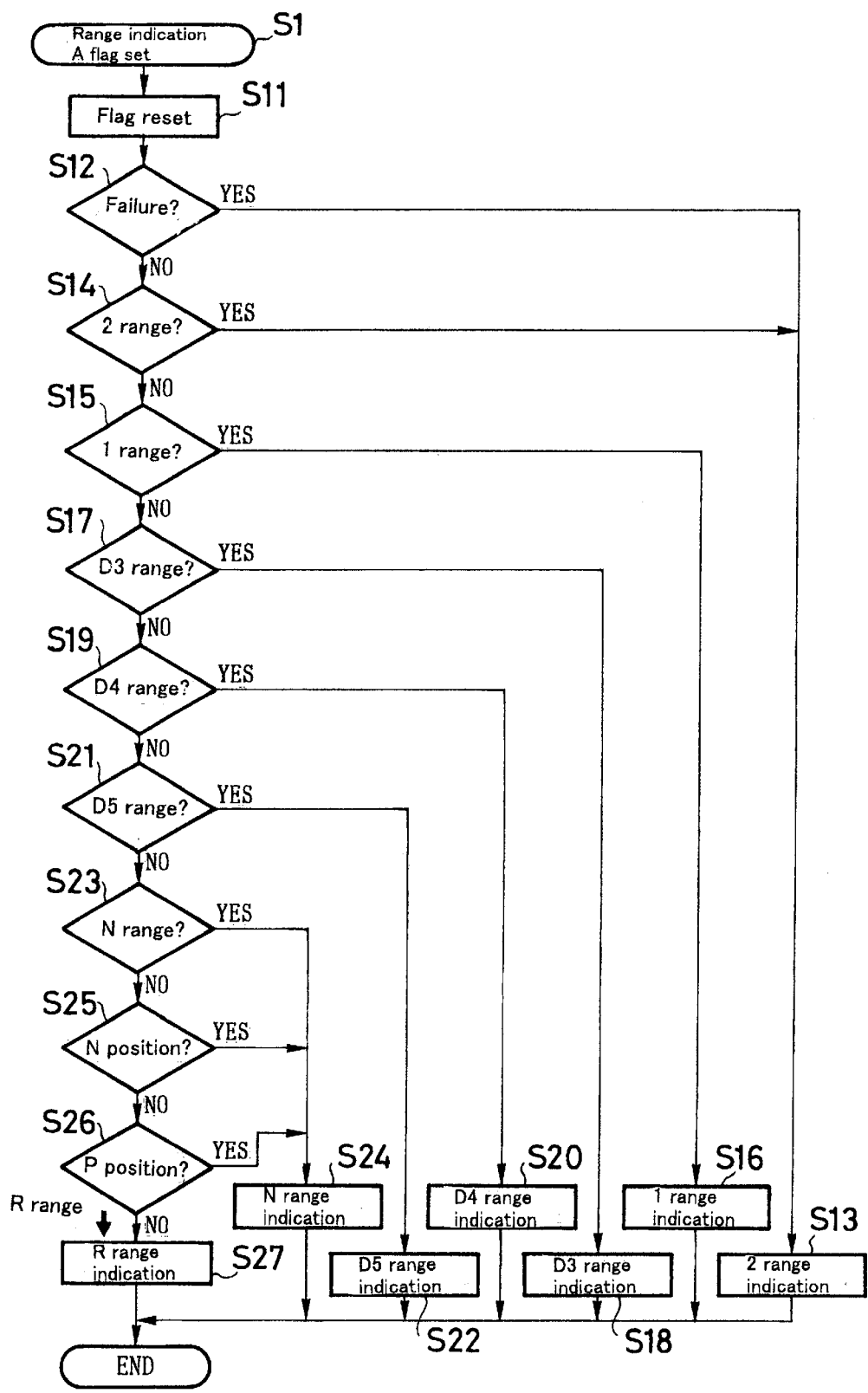
FIG. 19 is a flowchart showing steps of "A" indication control.

At first, the "A" indication flag which is set at Step S1 is described in reference to FIG. 19. At Step S11, the "A" indication flag is reset, and at Step S12, a determination is made whether there is a failure or not (abnormality detection). If there is a failure, the control flow proceeds to Step S13, where a "2" range indication is made. This is because when the system detects a failure, the transmission is controlled to shift automatically into the "2" range (F/S SECOND mode). This shift control performed on the detection of a failure will be described in detail later. If there is no failure, the control flow proceeds to Step S14, where a determination is made whether the transmission is in the "2" range or not. If it is in the "2" range, then the control flow proceeds to Step S13, where the same "2" range indication is made.

If the transmission is not in the "2" range, then the control flow proceeds to Step S15, where a determination is made whether the transmission is in the "1" range or not. If it is in the "1" range, then the control flow proceeds to Step S16, where a "1" range indication is made. On the other hand, if the transmission is not in the "1" range, then the control flow proceeds to Step S17, where a determination is made whether the transmission is in the "D3" range or not. If it is in the "D3" range, then the control flow proceeds to Step S18, where a "D3" range indication is made. On the other hand, if the transmission is not in the "D3" range, then the control flow proceeds to Step S19, where a determination is made whether the transmission is in the "D4" range or not. If it is in the "D4" range, then the control flow proceeds to Step S20, where a "D4" range indication is made. On the other hand, if the transmission is not in the "D4" range, then the control flow proceeds to Step S21, where a determination is made whether the transmission is in the "D5" range or not. If it is in the "D5" range, then the control flow proceeds to Step S22, where a "D5" range indication is made.

If the transmission is not in the "D5" range, i.e., not in the forward drive range, then the control flow proceeds to Step S23, where a determination is made whether the transmission is in the "N" range or not. If it is in the "N" range, the control flow proceeds to Step S24, where an "N" range indication is made. On the other hand, if the transmission is not in the "N" range, then the control flow proceeds to Step S25, where a determination is made whether the shift lever is at the "N" position or not. If it is at the "N" position, then the control flow proceeds to Step S24, where the same "N" range indication is made. On the other hand, if the shift lever is not at the "N" position, then the control flow proceeds to Step S26, where a determination is made whether the shift lever is at the "P" position or not. If it is at the "P" position, then the control flow proceeds to Step S24, where the same "N" range indication is made. On the other hand, if the shift lever is not at the "P" position, i.e., the transmission is in the "R" range, then the control flow proceeds to Step S27, where an "R" range indication is made.

Figure 20:
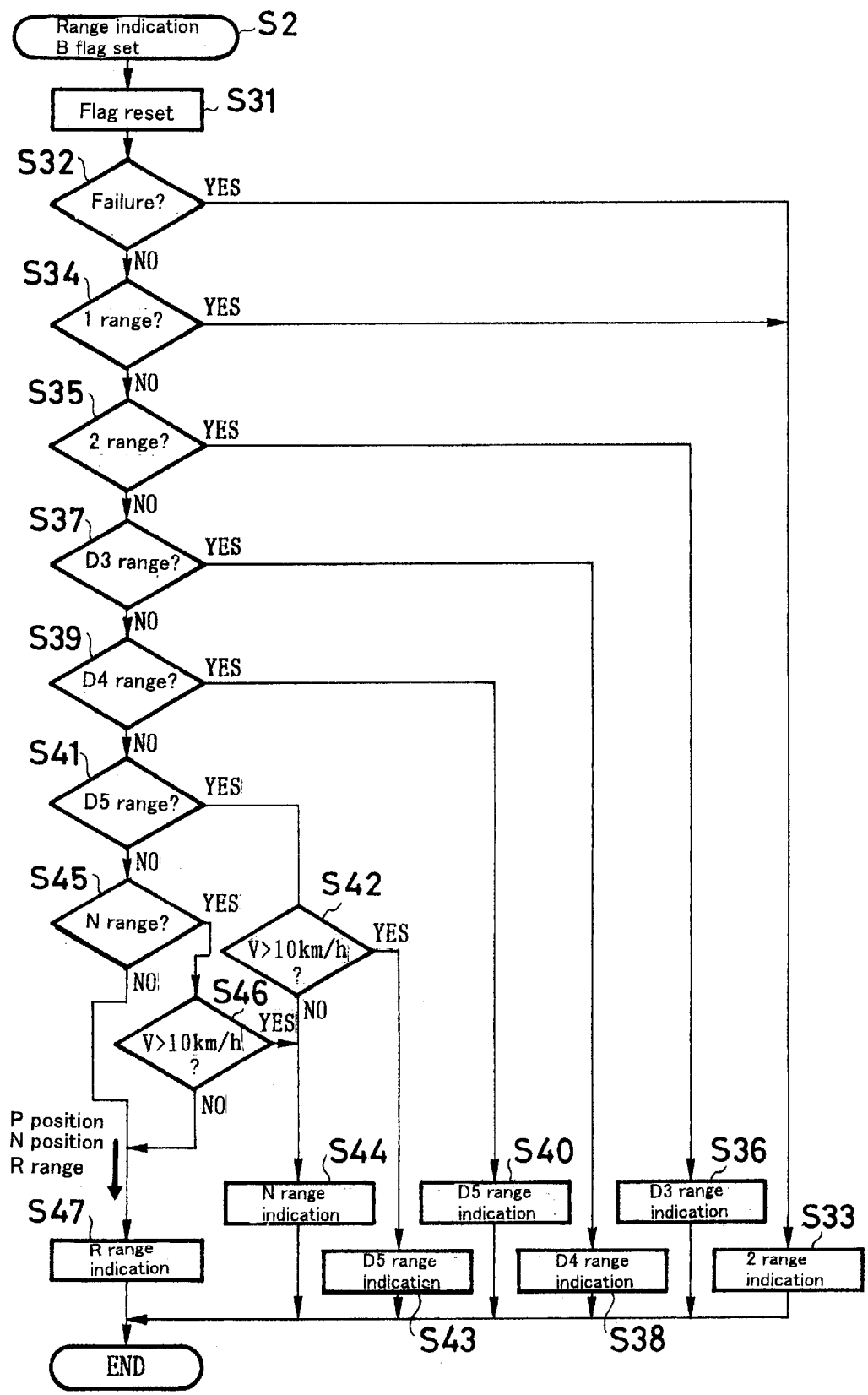
FIG. 20 is a flowchart showing steps of "B" indication control.

Now, the "B" indication flag which is set at Step S2 is described in reference to FIG. 20. At Step S31, the "B" indication flag is reset, and at Step S32, a determination is made whether there is a failure or not (abnormality detection). If there is a failure, then the control flow proceeds to Step S33, where a "2" range indication is made. As mentioned previously, the transmission is set fixedly in the "2" range upon the occurrence of a failure, so the "B" indication is also set in the "2" range indication. On the other hand, if there is no failure, then the control flow proceeds to Step S34, where a determination is made whether the transmission is in the "1" range or not. If it is in the "1" range, then the control flow proceeds to Step S33, where the "2" range indication is made. As mentioned previously, the "B" indication shows the range which is to be selected by the "+" operation. When the transmission is in the "1" range currently (this is shown in the "A" indication), the range to be selected by the "+" operation is the "2" range as shown in FIG. 16. Therefore, in this case, the "2" range indication is made for the "B" indication.

If the transmission is not in the "1" range, then the control flow proceeds to Step S35, where a determination is made whether the transmission is in the "2" range or not. If it is in the "2" range, then the control flow proceeds to Step S36, where a "D3" range indication is made. On the other hand, the transmission is not in the "2" range, the control flow proceeds to Step S37, where a determination is made whether the transmission is in the "D3" range or not. If it is in the "D3" range, then control flow proceeds to Step S38, where a "D4" range indication is made. On the other hand, if the transmission is not in the "D3" range, then the control flow proceeds to Step S39, where a determination is made whether the transmission is in the "D4" range or not. If it is in the "D4" range, then the control flow proceeds to Step S40, where a "D5" range indication is made.

Figure 17:
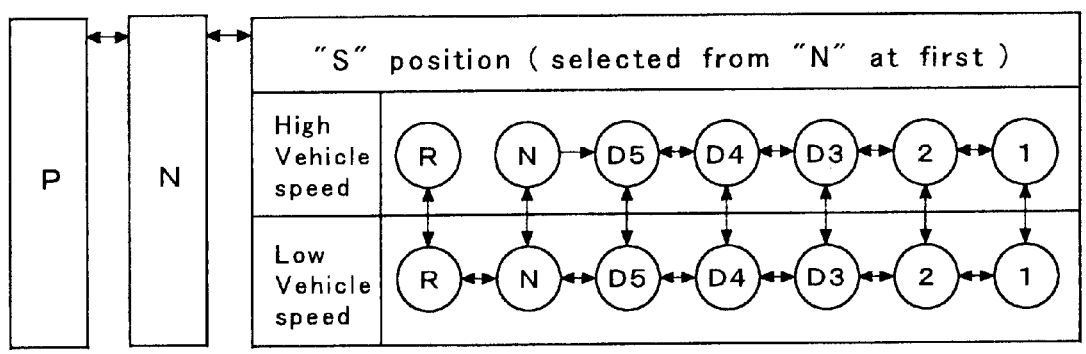
FIG. 17 is a diagram describing the sequence of range changes, which are executed in response to the manipulation of the shift lever at the S position.

If the transmission is not in the "D4" range, then the control flow proceeds to Step S41, where a determination is made whether the transmission is in the "D5" range or not. If it is in the "D5" range, then the control flow proceeds to Step S42, where a determination is made whether the current vehicle speed is higher than 10 km/h (predetermined vehicle speed) or not. If the speed is above this predetermined speed, then the control flow proceeds to Step S43, where the "D5" range indication is made, because the shift to the "N" range is prohibited at a speed higher than the predetermined speed as shown in FIG. 17. On the other hand, if the vehicle speed is equal to or lower than 10 km/h (predetermined vehicle speed), then the control flow proceeds to Step S44, where an "N" range indication is made, because the shift to the "N" range is allowed at a speed equal to or lower than the predetermined speed as shown in FIG. 17.

If the transmission is not in the "D5" range, i.e., not in the forward drive range, then the control flow proceeds to Step S45, where a determination is made whether the transmission is in the "N" range or not. If it is in the "N" range, then the control flow proceeds to Step S46, where a determination is made whether the vehicle speed is higher than 10 km/h (predetermined vehicle speed) or not. If the current speed of the vehicle is above the predetermined vehicle speed, then the control flow proceeds to Step S44, where the "N" range indication is made, because the shift to the "R" range is prohibited at such a high speed. On the other hand, if the vehicle speed is equal to or lower than the predetermined speed, then the control flow proceeds to Step S47, where an "R" range indication is made, because the shift to the "R" range is allowed at such a low speed.

Figure 21:
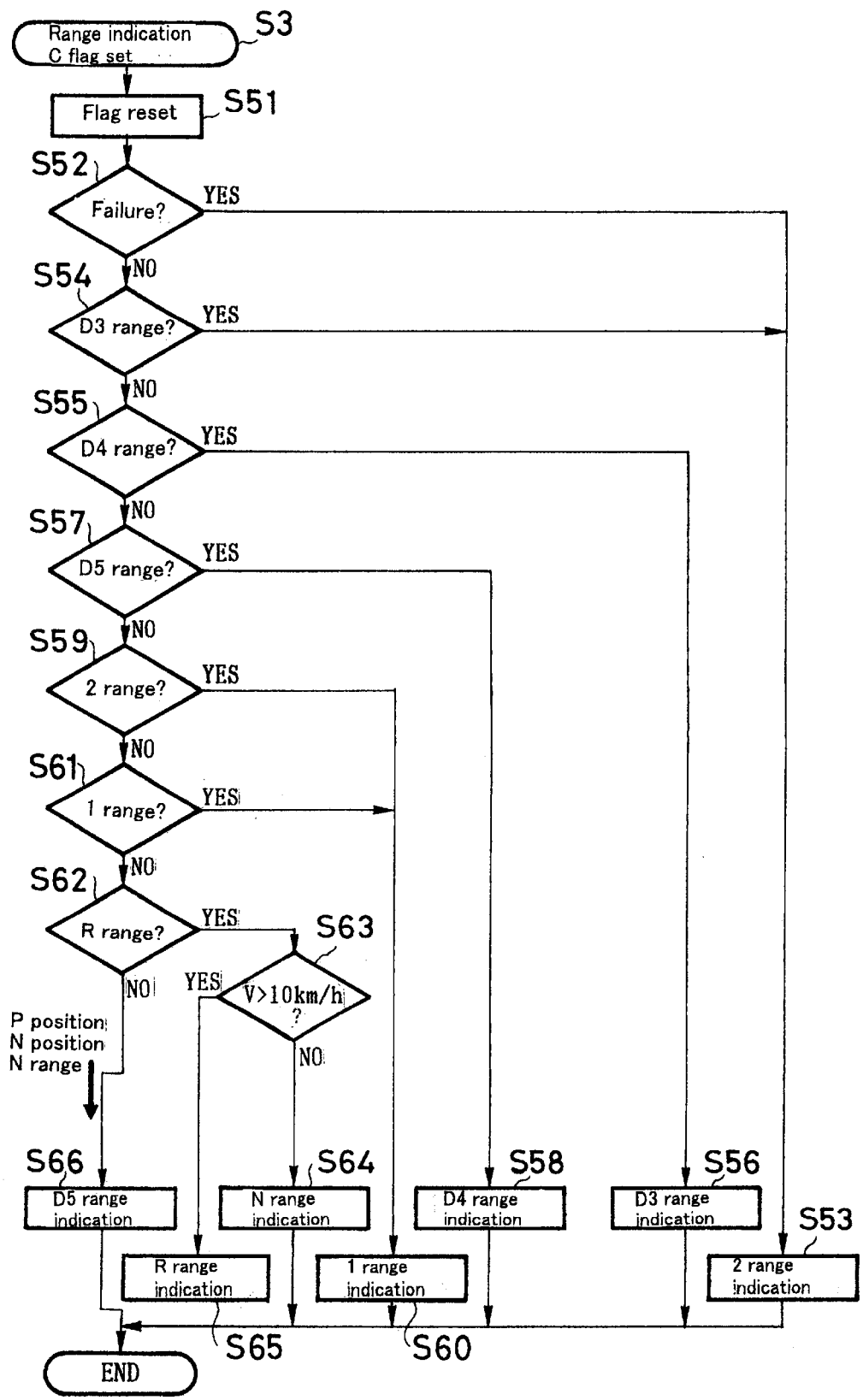
FIG. 21 is a flowchart showing steps of "C" indication control.

Now, the "C" indication flag which is set at Step S3 is described in reference to FIG. 21. At Step S51, the "C" indication flag is reset, and at Step S52, a determination is made whether there is a failure or not (abnormality detection). If there is a failure, then the control flow proceeds to Step S53, where a "2" range indication is made. As mentioned previously, the system fixes the transmission in the "2" range when there is a failure, so the "C" indication also shows the "2" range indication in this case. On the other hand, if there is no failure, then the control flow proceeds to Step S54, where a determination is made whether the transmission is in the "D3" range or not. If it is in the "D3" range, then the control flow proceeds to Step S53, where the "2" range indication is made. As described previously, the "C" indication is to show the range which is selected by the "−" operation of the shift lever 201. Therefore, when the current range (which is shown in the "A" indication) is the "D3" range, the "C" indication shows the "2" range as shown in FIG. 16.

If the transmission is not in the "D3" range, then the control flow proceeds to Step S55, where a determination is made whether the transmission is in the "D4" range or not. If it is in the "D4" range, then the control flow proceeds to Step S56, where a "D3" range indication is made. On the other hand, if the transmission is not in the "D4" range, then the control flow proceeds to Step S57, where a determination is made whether the transmission is in the "D5" range or not. If it is in the "D5" range, the control flow proceeds to Step S58, where a "D4" range indication is made. On the other hand, if the transmission is not in the "D5" range, then the control flow proceeds to Step S59, where a determination is made whether the transmission is in the "2" range or not. If it is in the "2" range, then the control flow proceeds to Step S60, where a "1" range indication is made.

On the other hand, if the transmission is not in the "2" range, then the control flow proceeds to Step S61, where a determination is made whether the transmission is in the "1" range or not. If it is in the "1" range, then the control flow proceeds to Step S60, where a "1" range indication is made, because the transmission is kept in the "1" range even if the shift lever is manipulated onto the "−" side. On the other hand, if the transmission is not in the "1" range, i.e., not in the forward drive range, then the control flow proceeds to Step S62, where a determination is made whether the transmission is in the "R" range or not. If it is in the "R" range, then control flow proceeds to Step S63, where a determination is made whether the vehicle speed is higher than 10 km/h (predeterminedvehicle speed) or not. If the speed is above this predetermined vehicle speed, then the control flow proceeds to Step S65, where an "R" range indication is made, because the system prohibits the transmission to shift into the "N" range. On the other hand, if the vehicle speed is equal to or lower than the predetermined vehicle speed, then the control flow proceeds to Step S64, where an "N" range indication is made, because the shift into the "N" range is allowed in such a vehicle speed. If the transmission is not in the "R" range, then it is in the "N" range, or the shift lever is at the "N" position or the "P" position. In this case, the control flow proceeds to Step S66, where a "D5" range indication is made.

Figure 22:
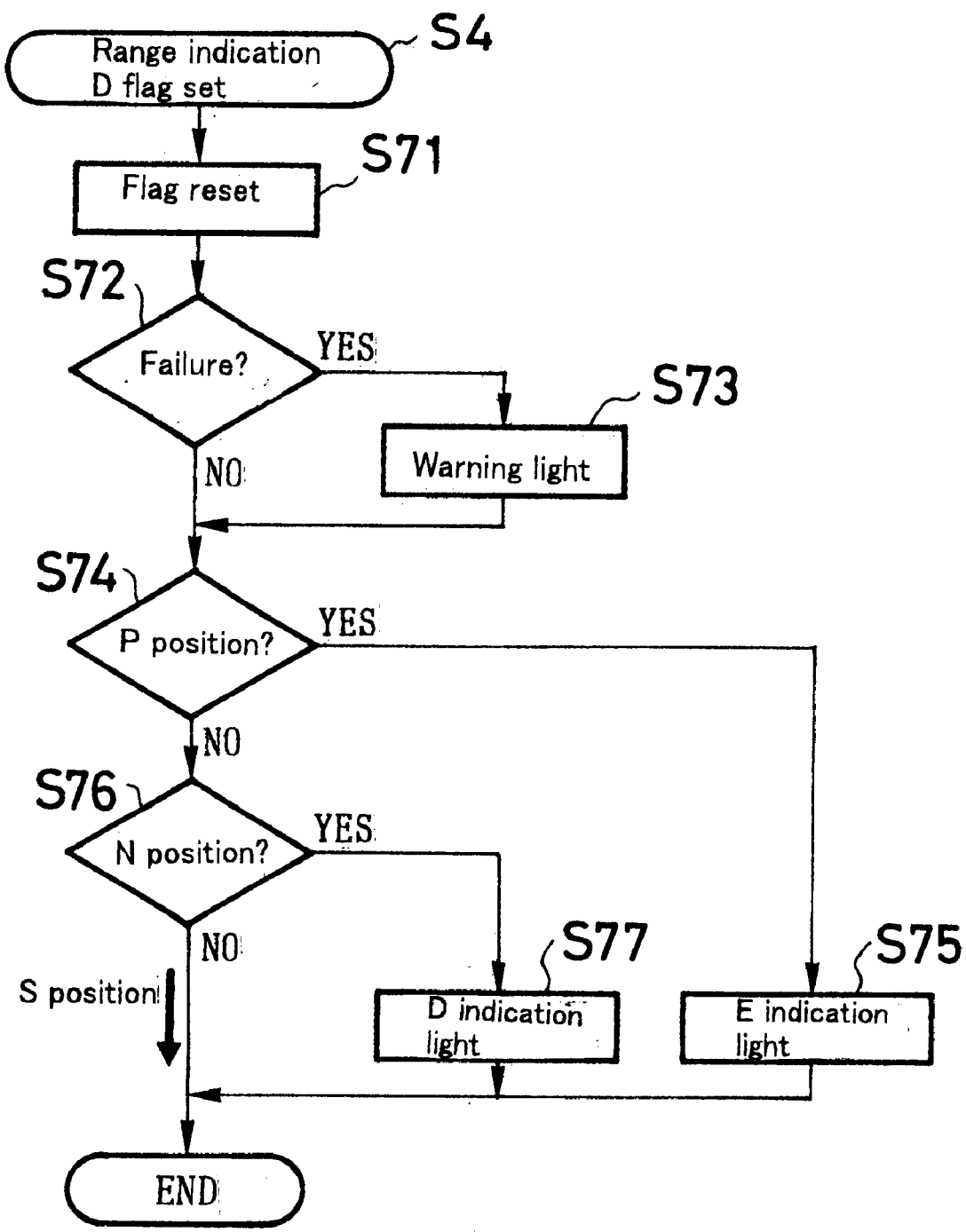
FIG. 22 is a flowchart showing steps of "D" indication control.

Now, the "D" indication flag which is set at Step S4 is described in reference to FIG. 22. Here, the "D" indication on the seventh indicator 254, the "E" indication on the eighth indicator 255 and the warning indication on the ninth indicator 256 are controlled. At Step S71, the indication flags are reset, and at Step S72, a determination is made whether there is a failure or not (abnormality detection). If there is a failure, then the control flow proceeds to Step S73, where a warning indication is lit up to alarm the driver. On the other hand, if there is no failure, then the control flow proceeds to Step S74, where a determination is made whether the shift lever is at the "P" position or not. If it is at the "P" position, then the control flow proceeds to Step S75, where the "E" indication is lit up. On the other hand, if the shift lever is not at the "P" position, then the control flow proceeds to Step S76, where a determination is made whether the shift lever is at the "N" position or not. If it is at the "N" position, then the control flow proceeds to Step S77, where a "D" indication is lit up.

As mentioned above, in addition to the control of the indicators to display these indications, the control system performs detection of failures. When the system detects a failure, it automatically switches the operational mode of the transmission into the F/S (fail-safe) SECOND mode and secures a certain driving performance. For detecting failures, a plurality of hydraulic switches 91, 92 and 93 are provided and arranged as shown in FIGS. 6~11. One hydraulic switch 91 detects the pressure of the THIRD speed clutch, another hydraulic switch 92 detects the pressure of the SECOND speed clutch, and the other hydraulic switch 93 detects the pressure of the right side oil chamber 73 of the forward/reverse selection hydraulic servomechanism 70. In addition, the control system detects the actuation signals of the first~fifth on/off solenoid valves 81 85 and continually monitors what mode the transmission is in.

With the hydraulic switch 93 which is sensitive to the pressure inside the right side oil chamber 73 of the forward/reverse selection hydraulic servomechanism 70, the system can detect at which side, i.e., the reverse drive range or the forward drive range, the dog clutch 16 is set by the forward/reverse selection hydraulic servomechanism 70. In this way, the system monitors the condition of the dog clutch together with the condition of the first~fifth on/off solenoid valves 81~85 through the above mentioned actuation signals. As a result, the system is capable of determining a failure if it may happen. For example, if the line pressure exists in the left side oil chamber 72, indicating the dog clutch 16 being set at the R range position, while the actuation signals of the first~fifth on/off solenoid valves 81~85 are detected to correspond to one of the modes set for the D range, the system judges this condition as a failure. In the same way, if the line pressure exists in the right side oil chamber 73, indicating the dog clutch 16 being set at the D range position, while the actuation signals of the first~fifth on/off solenoid valves 81~85 are detected to correspond to a mode for the R range, the system also judges this condition as a failure.

The control system determines from the position of the forward/reverse selection hydraulic servomechanism 70 and from the pattern of the actuation signals whether they are in harmony and the transmission is operating normally or not, detecting failures. Therefore, if any abnormality or breakdown occurs, the system can detect it and control the transmission accordingly, for example, by setting the transmission into the Fail Safe SECOND mode. Such control is described in the following in reference to the flowcharts shown in FIG. 23 and thereafter.

Figure 23:
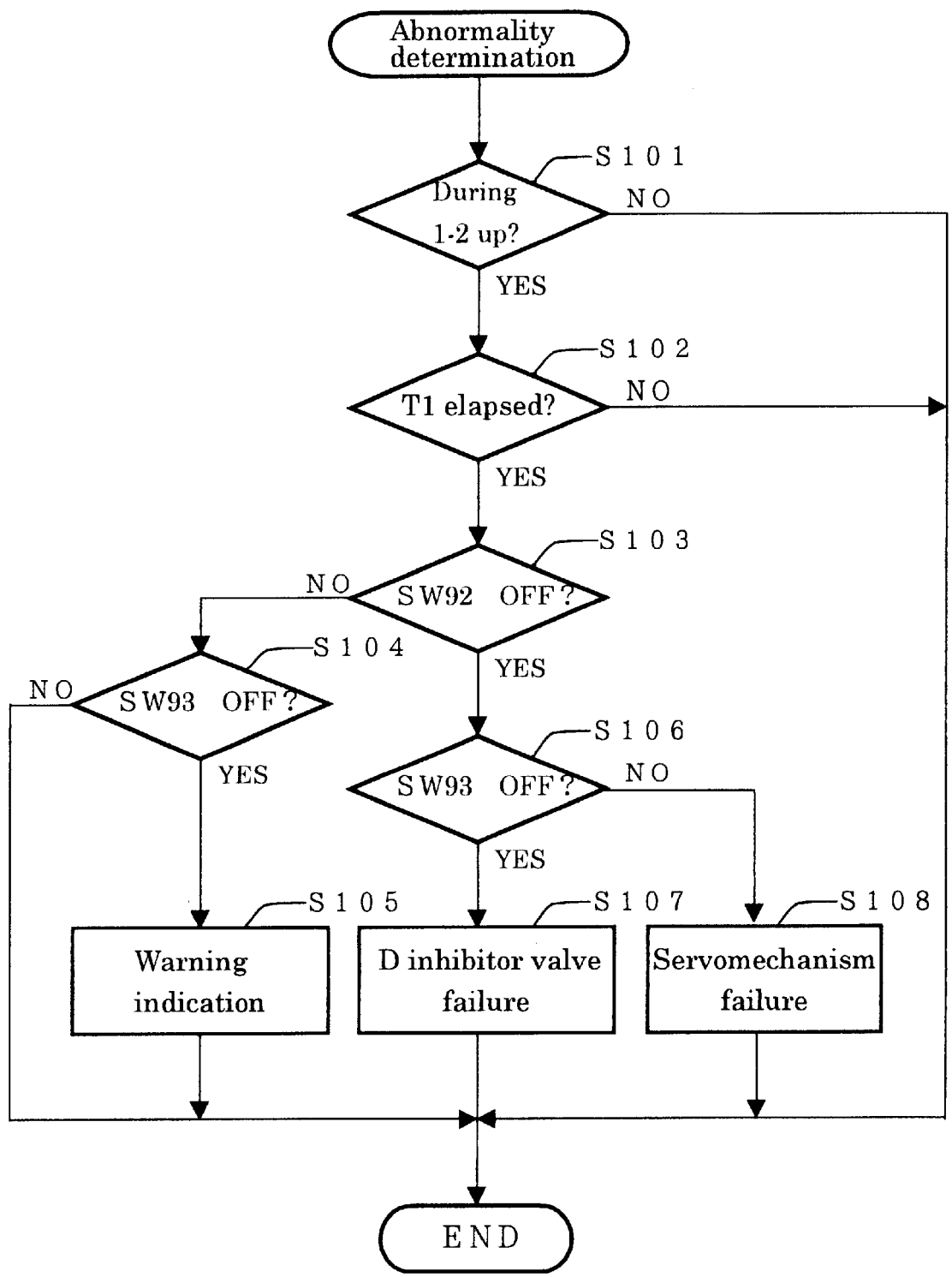
FIG. 23 is a flowchart showing steps of an abnormality determination control which is executed by an electronic control unit in the automatic transmission.

The control system performs a fault detection by comparing the result of the detection by the hydraulic switches 92 and 93 with the actuation signals of the first~fifth on/off solenoid valves 81~85. It is clear from the above description that the determination of faults is carried out when the transmission is shifting up from the first speed ratio to the second speed ratio because the hydraulic switch 92 detects the pressure which actuates the SECOND speed clutch 12. FIG. 23 shows the steps of the fault determination. At first, a determination is made whether the transmission is shifting up from the first speed ratio to the second speed ratio or not at Step S101. If it is upshifting, then the control flow proceeds to Step S 102, where it waits for a predetermined time T1 until the upshift operation completes, and then the control flow proceeds to Step S103. On the other hand, if the transmission is not upshifting, or if the control is waiting for the elapse of the predetermined time T1, then this turn of the control routine ends without performing the fault determination.

At Step S103, a determination is made whether the hydraulic switch 92 is OFF or not, i.e., whether the pressure to actuate the SECOND speed clutch 12 is being supplied or not. If the hydraulic switch 92 is ON, then the control flow proceeds to Step S104, where another determination is made whether the hydraulic switch 93 is OFF or not. If the hydraulic switch 93 is judged being ON at Step S104, meaning that the transmission is operating normally, then this turn of the control flows to the end of the routine. On the other hand, if the hydraulic switch 93 is judged being OFF at Step S104, then a warning lamp is lighted to notify the breakdown of the hydraulic switch 93. In this case, the fault is only of the hydraulic switch 93, so the other parts are judged all right without any fault at a fault confirmation step at Step S112, which is described later in this section. As a result, the transmission is controlled in an ordinary driving mode.

On the other hand, if the hydraulic switch 92 is judged being OFF at Step S103, then the control flow proceeds to Step S106, where a determination is made whether the hydraulic switch 93 is OFF or not. Here, if the hydraulic switch 93 is judged being OFF, then it is considered that the D inhibitor valve 58 is malfunctioning. In this case, the breakdown of the D inhibitor valve 58 should be confirmed (additionally, the warning lamp may be lighted indicating the abnormality). However, if the hydraulic switch 93 is judged being ON at Step S106, then the forward/reverse selection hydraulic servomechanism 70 (or the fourth shift valve 66) may be malfunctioning. This abnormality should be confirmed (additionally, the warning lamp may be lighted indicating the abnormality). The above mentioned results of the fault determination are summarized in the following table, Table 2.

TABLE 2

| D range 1–2 upshift | | Hydraulic Switch 93 | |
|---|---|---|---|
| Fault check | | ON | OFF |
| Hydraulic Switch 92 | ON | Normal | Switch 93 failure |
| | OFF | Servomechanism failure | D inhibitor valve failure |

Figure 25:
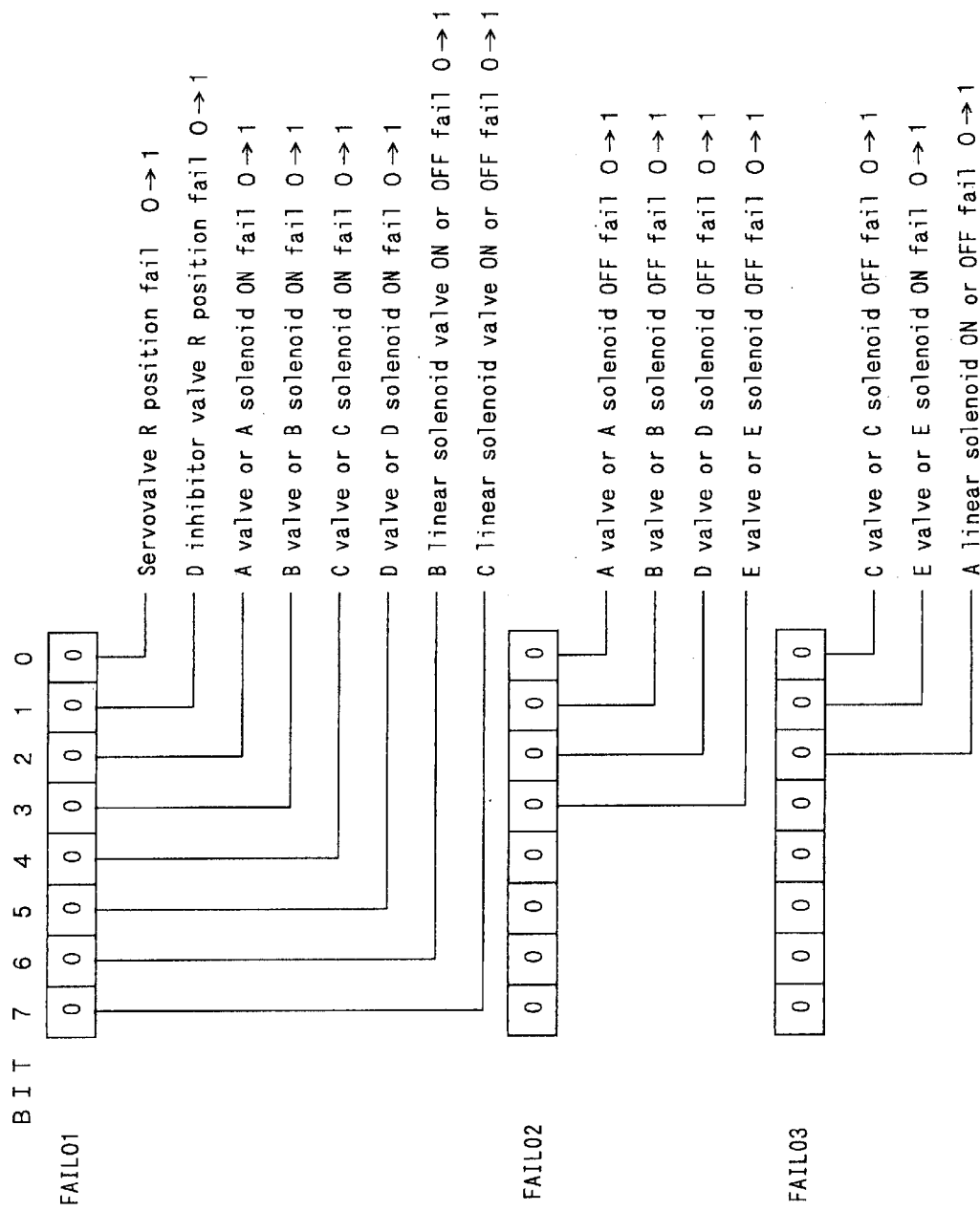
FIG. 25 is a list showing the results of the abnormality determination, which are stored in memory.

Although the fault determination is described only for the D inhibitor valve 58 and the forward/reverse selection hydraulic servomechanism 70 here, the fault determination is executed for various components, and the results are stored in memory in a format as shown in FIG. 25. If no fault is found for an item, then value "0", or if any fault is found for that item, then value "1" is placed in a corresponding bit address of one of three memory sections, FAIL01, FAIL02 and FAIL03, as shown in FIG. 25. Thus, the existence of faults is immediately recognizable.

Figure 24:
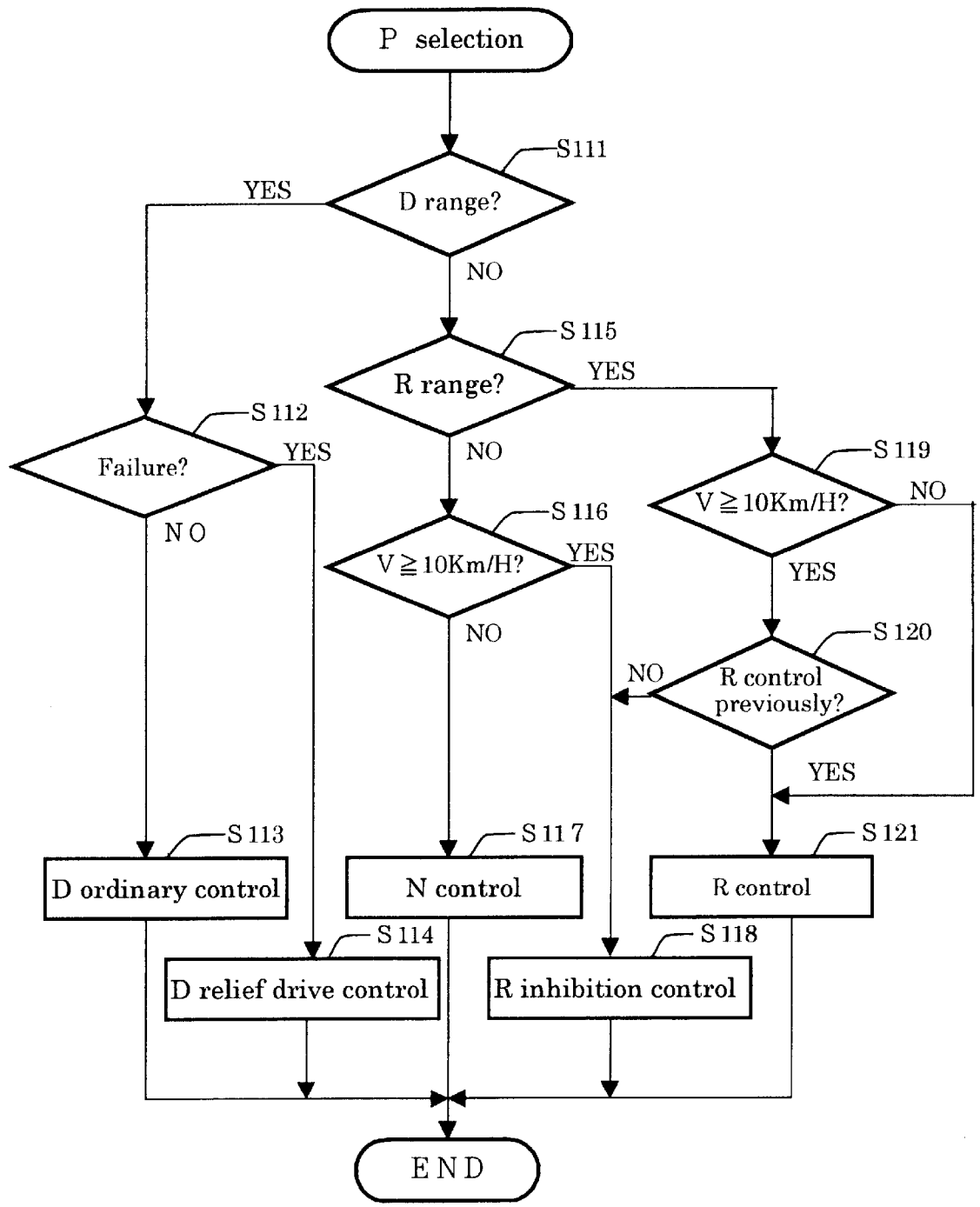
FIG. 24 is a flowchart showing steps of a speed change control executed by the electronic control unit.

Now, a description is given of the speed change control of the automatic transmission according to the present invention in reference to the flowchart of FIG. 24. This speed change control is executed on the basis of the above described fault determination. At first, the control determines the drive range which is selected with the shift lever by the driver at the driver seat. If the transmission is judged as being set in the D range at Step S111, then the control flow proceeds to Step S112, where a determination is made whether there is any fault or not. If there is a fault found in the above described fault determination, i.e., at Step S107 or Step S108 in the flowchart shown in FIG. 23, then the existence of a fault is recognized at Step S112. In this case, the control flow proceeds to Step S114, where the system executes a D range relief drive control to operate the transmission in the F/S (Fail Safe) SECOND mode and thereby allows the vehicle to drive at the second speed ratio. On the other hand, if the transmission is judged as having no fault at Step S112, then the control flow proceeds to Step S113, where the transmission is controlled to operate in the D range in an ordinary way.

However, if the transmission is judged as not being in the D range at Step S111, the control flow proceeds to Step S115, where another determination is made whether the transmission is set in the R range or not. If it is judged not in the R range, then the control flow proceeds to Step S116 because the transmission is in the N range. At Step S116, a determination is made whether the current speed V of the vehicle is equal to or higher than 10 km/h or not. If the vehicle speed V is lower than 10 km/h, then the system sets the normal neutral mode, i.e., the Second NEUTRAL mode, in which the driver can manipulate the shift lever to select the D range or the R range, at Step S117. However, if the current vehicle speed V is higher than 10 km/h, then the system prevents the transmission from shifting into the Reverse mode, i.e., sets the First NEUTRAL mode, which functions as a reverse inhibitor, at Step S118.

On the other hand, if the transmission is judged as being in the R range at Step S115, then the control flow proceeds to Step S119, where a determination is made whether the current speed V of the vehicle is equal to or higher than 10 km/h or not. If the vehicle speed V is lower than 10 km/h, then the control flow proceeds to Step S121, where the system controls to maintain the R range. However, if the current vehicle speed V is higher than 10 km/h, then the control flow proceeds to Step S120, where a determination is made whether the transmission was controlled to shift into the REVERSE mode in the last flow of the routine or not. If the transmission was not controlled into the REVERSE mode in the last flow, the control flow proceeds to Step S118 because the control of Step S118 is considered as being still going on. Therefore, the system maintains the First NEUTRAL mode, which functions as a reverse inhibitor. On the other hand, if the transmission was set into the REVERSE mode in the last flow, then it is maintained in the REVERSE mode at Step S121.

Figure 26:
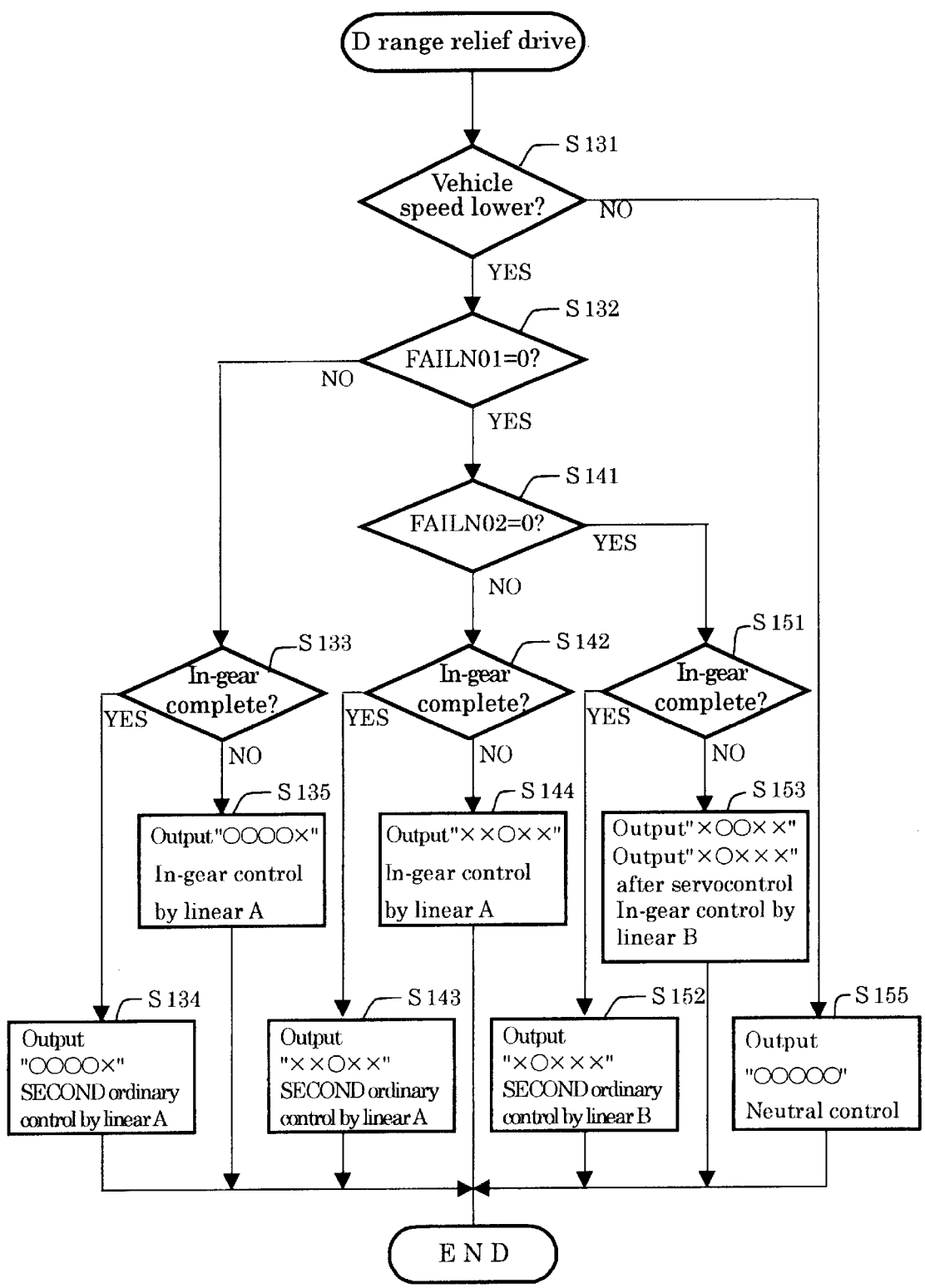
FIG. 26 is a flowchart showing steps of a D range relief drive control.

Now, the D range relief drive control, which is executed at Step S114 of the above described control, is explained in reference to FIG. 26. This control is executed when there is a fault, i.e., FAIL01≠0, FAIL02≠0, or FAIL03≠0. At Step S131, a determination is made whether or not the vehicle speed V is equal to or lower than a predetermined speed which causes an over rotation at the second speed ratio. If the vehicle speed V is higher than this predetermined speed, then the control flow proceeds to Step S155, where the first~fifth on/off solenoid valves 81~85 are set into condition "○○○○○". Here, the "○" marks represent the turned ON states of the solenoid valves, each symbol corresponding, in the order from the left to the right, to the first~fifth on/off solenoid valves 81~85, respectively. Additionally, "×" marks are used to represent the turned OFF states of solenoid valves. In other words, all the solenoid valves 81~85 are turned on at Step S155 to bring the transmission into the First NEUTRAL mode (refer to Table 1).

On the other hand, if the vehicle speed V is equal to or lower than the predetermined speed, then the control flow proceeds to Step S132, where a determination is made whether the value of the first memory section is zero, FAIL01=0, or not. If the value stored at any bit address of the first memory section FAIL01 is one, then the value stored in the first memory section is not zero, FAIL01≠0, so the control flow proceeds to Step S133, where a determination is made whether an in-gear control is complete or not. If the result of the determination is that an in-gear control is complete, then the control flow proceeds to Step S134, where the solenoid valves are set into condition "○○○○×", i.e., the F/S (Fail Safe) SECOND mode (refer to Table 1), and the transmission is controlled to operate at the second speed ratio by the actuation of the first linear solenoid valve 86. If the result of the determination at Step S133 is that an in-gear control is still halfway, then the control flow proceeds to Step S135, where the solenoid valves are set into condition "○○○○×", and the in-gear control is executed by the actuation of the first linear solenoid valve 86.

If the value stored in the first memory section is judged being zero, FAIL01=10, at Step S132, then the control flow proceeds to Step S141, where a determination is made whether the value stored in the second memory section is zero, FAIL02=0, or not. If the value stored at any bit address of the second memory section FAIL02 is one, then the value stored in the second memory section is not zero, FAIL02≠0, so the control flow proceeds to Step S142, where a determination is made whether an in-gear control is complete or not. If the result of the determination is that an in-gear control is complete, then the control flow proceeds to Step S143, where the solenoid valves are set into condition "××○××", i.e., the 2-3-4 mode (refer to Table 1), and the transmission is controlled to operate at the second speed ratio by the actuation of the first linear solenoid valve 86. On the other hand, if the result of the determination is that an in-gear control is still halfway, then the control flow proceeds to Step S144, where the solenoid valves are set into condition "××○××", and the in-gear control is executed by the actuation of the first linear solenoid valve 86.

However, if the value stored in the second memory section is judged being zero, FAIL02=0, at Step S141, indicating that the value stored in the third memory section is not zero, FAIL03≠0, then the control flow proceeds to Step S151, where a determination is made whether an in-gear control is complete or not. If the result of the determination is that an in-gear control is complete, then the control flow proceeds to Step S152, where the solenoid valves are set into condition "×○×××", i.e., the SECOND mode (refer to Table 1), and the transmission is controlled to operate at the second speed ratio by the actuation of the second linear solenoid valve 87. On the other hand, if the result of the determination is that an in-gear control is still halfway, then the solenoid valves are set into condition "×○○××", i.e., the In-gear mode (refer to Table 1). Then, after the forward/reverse selection hydraulic servomechanism 70 is actuated, the solenoid valves are set into condition "×○×××", and the in-gear control is executed by the actuation of the second linear solenoid valve 87.

As described above, in the shift control system according to the present invention, the shift lever is moved along the first shift guide path to select either the parking position ("P" position) or the driving position ("S" position), and then while the vehicle is in operation, the shift lever is moved along the second shift guide path to select an appropriate range from a plurality of ranges, which include a reverse range (R range), a neutral range (N range) and forward drive ranges (D5, D4, D3, 2, 1, etc.). Therefore, the shift control system according to the present invention provides an improved operativity to the manipulation of the shift lever.

Preferably, the shift control system may be arranged such that the transmission is set into the neutral range when the shift lever is moved from the neutral position ("N" position) to the selection position ("S" position) in the first shift guide path, and then the transmission is set into an appropriate range in a predetermined sequence every time when the shift lever is swiveled in the second shift guide path. With this arrangement, the control of the vehicle flows smoothly from the parking condition to the driving condition as the neutral range is the first range which is selected when the shift lever is moved from the neutral position to the selection position in the first shift guide path. Furthermore, as the selection of the drive ranges is effected simply by swiveling the shift lever at the selection position along the second shift guide path, the shift control system according to the present invention makes the manipulation of the shift lever easy and simple.

It is also preferable to provide the shift control system with a sensor which detects the speed of the vehicle and to arrange the system to prohibit the selection of a certain range (first predetermined range) even though the shift lever is manipulated along the second shift guide path while the speed of the vehicle detected is above a predetermined speed. In this arrangement, even if the driver manipulates the shift lever accidentally in a way to select the reverse range while the vehicle is driving forward, the neutral range can be set for safety instead of the reverse range.

Moreover, it is preferable that the shift control system be provided with means of detecting abnormality or a failure in the execution of the range selection performed in response to the shift lever. In this case, the system is arranged such that if a failure is detected, then a certain range (second predetermined range) can be selected automatically when the shift lever is positioned at the selection position. With this arrangement, when a failure or abnormality is detected, the transmission is set into the "2" range as the second predetermined range, and the vehicle in this limited performance can be driven to a garage for repair.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2000-042291 filed on Feb. 21, 2000, which is incorporated herein by reference.

What is claimed is:

1. A shift control system for a vehicular automatic transmission, comprising:
 a shift lever, which a driver manipulates to shift at least among a parking position, a neutral position and a selection position;
 a first shift guide path which guides said shift lever from said parking position through said neutral position to said selection position; and
 a second shift guide path which guides said shift lever positioned at said selection position into a direction different from that of said first shift guide path;

wherein:
 a plurality of ranges including a forward drive range, a neutral range and a reverse drive range are selectable individually by shifting said shift lever appropriately in said second shift guide path.

2. The shift control system as set forth in claim 1, wherein:
 said first shift guide path and said second shift guide path are provided as an opening in a shift box;
 said shift lever having a knob at a top is provided pivotally in said shift box, said shift lever extending out of said shift box through said shift guide paths; and
 said knob is gripped by the driver to shift said shift lever along said first shift guide path and said second shift guide path.

3. The shift control system as set forth in claim 1, wherein:
 said first shift guide path is an "L"-shaped opening, which extends forward and rearward and laterally; and
 said second shift guide path is an opening which is continuous from a right or left lateral end of said first shift guide path and extends forward and rearward.

4. The shift control system as set forth in claim 1, further comprising:
 a position detection switch which detects that said shift lever is at said parking position, at said neutral position and at said selection position, respectively; and
 an operation detection switch which detects that said shift lever at said selection position is shifted along said second shift guide path.

5. The shift control system as set forth in claim 4, further comprising an indication unit;

wherein:
 when said position detection switch detects that said shift lever is positioned at any of said parking position, said neutral position and said selection position, said indication unit indicates this exact position of said shift lever detected by said position detection switch; and
 when said operation detection switch detects that said shift lever at said selection position is shifted along said second shift guide path, said indication unit indicates this shift operation of said shift lever detected by said operation detection switch.

6. The shift control system as set forth in claim 1, wherein:
 when said shift lever is positioned at said parking position, said transmission is set in said neutral range, and a parking gear, which is provided in said transmission, is fixed stationary to establish a parking condition; and
 when said shift lever is then shifted to said neutral position, said transmission is kept in said neutral range, but said parking gear is released.

7. The shift control system as set forth in claim 1, wherein:
 when said shift lever is shifted from said neutral position to said selection position in said first shift guide path, said neutral range is established; and every time when said shift lever is swiveled in said second shift guide path, an appropriate range is selected in a predetermined sequence from said ranges and established.

8. The shift control system as set forth in claim 7, wherein:

after said shift lever is shifted from said neutral position to said selection position in said first shift guide path, establishing said neutral range, if said shift lever is swiveled once to a "+" side in said second shift guide path, then said reverse range is established; but if said shift lever is swiveled repeatedly to a "−" side in said second shift guide path, each swiveling changes said transmission's range setting sequentially from a highest speed range to a lowest speed range.

9. The shift control system as set forth in claim 8, further comprising a vehicle speed sensor which detects speed of a vehicle;

wherein:

while the vehicle speed detected by said vehicle speed sensor is equal to or higher than a predetermined speed, said transmission is not allowed to shift between said neutral range and said reverse drive range as well as from said highest speed range to said neutral range, even if said shift lever is swiveled in any way in said second shift guide path; but said transmission is allowed to shift from said neutral range to said highest speed range if said shift lever is swiveled appropriately.

10. The shift control system as set forth in claim 1, further comprising a vehicle speed sensor which detects speed of a vehicle;

wherein:

while the vehicle speed detected by said vehicle speed sensor is equal to or higher than a predetermined speed, said transmission is not allowed to shift into a first predetermined range of said plurality of ranges, even if said shift lever is swiveled in any way in said second shift guide path.

11. The shift control system as set forth in claim 1, further comprising abnormality detection means for detecting a failure of said system, which sets said ranges in response to said shift of said shift lever;

wherein:

if a failure is detected by said abnormality detection means, then when said shift lever is positioned at said selection position, said transmission is set into a second predetermined range of said plurality of ranges.

12. The shift control system as set forth in claim 11, wherein:

said second predetermined range is executed in a fail-safe SECOND mode.

* * * * *